United States Patent
Agarwal et al.

(10) Patent No.: US 10,237,186 B2
(45) Date of Patent: *Mar. 19, 2019

(54) ENFORCING DATACENTER-LEVEL CONGESTION CONTROL

(71) Applicant: International Business Machines Corporation, Armonk, NY (US)

(72) Inventors: Kanak B. Agarwal, Austin, TX (US); John Carter, Austin, TX (US); Wesley M. Felter, Austin, TX (US); Yu Gu, Cedar Park, TX (US); Keqiang He, Madison, WI (US); Eric J. Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,285

(22) Filed: Feb. 5, 2018

(65) Prior Publication Data

US 2018/0176137 A1   Jun. 21, 2018

Related U.S. Application Data

(63) Continuation of application No. 15/068,837, filed on Mar. 14, 2016, now Pat. No. 9,942,151.

(51) Int. Cl.
*H04L 12/801* (2013.01)
*H04L 12/807* (2013.01)
*H04L 12/26* (2006.01)

(52) U.S. Cl.
CPC ............. *H04L 47/12* (2013.01); *H04L 43/08* (2013.01); *H04L 43/0882* (2013.01); *H04L 47/27* (2013.01)

(58) Field of Classification Search
None
See application file for complete search history.

(56) References Cited

U.S. PATENT DOCUMENTS 9,584,418 B2 *   2/2017   Iles ........................ H04L 47/11
2001/0032269 A1 * 10/2001   Wilson .................... H04L 47/10
709/235

(Continued)

OTHER PUBLICATIONS

L. Kalampoukas, A. Varma, and K. K. Ramakrishnan.Explicit Window Adaptation: A Method to Enhance TCP Performance. IEEE/ACM Transactions on Networking, 2002.*

(Continued)

*Primary Examiner* — Ayaz R Sheikh
*Assistant Examiner* — Tarell A Hampton
(74) *Attorney, Agent, or Firm* — Garg Law Firm, PLLC; Rakesh Garg; Mercedes L. Hobson

(57) ABSTRACT

At an application executing in conjunction with a vSwitch in a host system, a CWND value is computed corresponding to a flow from a VM using a period measured by a timer and a number of packets of the flow received and acknowledged in response packets, the number being counted by a counter, the timer being associated with a packet of the flow. The CWND value is stored in a field in a response packet received from a receiver of the flow, the field being designated for carrying a RWND value, the response packet corresponding to a packet in the flow. The storing forms a modified response packet.

20 Claims, 17 Drawing Sheets

(56) References Cited

U.S. PATENT DOCUMENTS

| | | | |
|---|---|---|---|
| 2004/0120256 A1* | 6/2004 | Park | H04L 47/10 370/235 |
| 2015/0089500 A1* | 3/2015 | Kompella | H04L 43/18 718/1 |
| 2015/0365325 A1* | 12/2015 | Hwang | H04L 47/70 370/230 |
| 2016/0294698 A1* | 10/2016 | Berberana Fernandez-Murias | H04L 47/12 |

OTHER PUBLICATIONS

J. Hwang, J. Yoo, S. H. Lee and H. W. Jin, "Scalable Congestion Control Protocol Based on SDN in Data Center Networks," 2015 IEEE Global Communications Conference (GLOBECOM), San Diego, CA, 2015, pp. 1-6.*

Appendix P, 2018.

* cited by examiner

ENFORCING DATACENTER-LEVEL CONGESTION CONTROL

TECHNICAL FIELD

The present invention relates generally to a method, system, and computer program product for reducing data traffic congestion in data communication networks. More particularly, the present invention relates to a method, system, and computer program product for virtual switch-based congestion control for datacenter networks.

BACKGROUND

A data communication network, or simply, data network, facilitates data transfers between two or more data processing systems. For example, an application executing in one data processing system acts as the sender of the data, and another application executing in another data processing system acts as the receiver of the data. Between the sender system and the receiver system, the data follows a data path that comprises one or more links between networking components, such as routers and switches.

In a data processing environment, such as in a datacenter, many data processing systems are connected via a data network. At any given time, several systems may be transmitting data of various sizes to several other systems. Many of these data transmissions can utilize a common link in the network, to get from their respective sender systems to their respective receiver systems.

A data communication link in a network can become congested when more than a threshold amount of data traffic tries to use the link during a given period. The data traffic of some data flows (hereinafter, "flow", or "flows") appears in bursts, causing the data traffic on a link to spike. A link can also be over-subscribed, i.e., too many flows may try to use the link at a given time. Packet loss, increased network latency, and timeouts are some examples of problems that are caused when the utilization of a link exceeds a threshold and congestion occurs.

Some flows in a network are small flows and some are large flows. A flow that transmits less than a threshold amount of data in a given period is a small flow. A flow that transmits the threshold amount of data or more in a given period is a large flow. The data of a flow comprises packets of data. Generally, the larger the flow, the more the number of the packets therein. The packets of the various flows wanting to use a link are queued.

In many datacenters, a sending system, a receiving system, or both can be virtual machines. A virtual machine (VM) comprises virtualized representations of real hardware, software, and firmware components available in a host data processing system. The data processing system can have any number of VMs configured thereon, and utilizing any number of virtualized components therein.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a datacenter, thousands of VMs can be operating on a host at any given time, and hundreds if not thousands of such hosts may be operational in the datacenter at the time. A virtualized data processing environment such as the described datacenter is often referred to as a "cloud" that provides computing resources and computing services to several clients on an as-needed basis.

Congestion control is a process of limiting or reducing data congestion in a section of a network, such as at a networking device or in a link. Presently, congestion control is a function of the Transmission Control Protocol/Internet Protocol (TCP/IP) stack. The TCP/IP stack is implemented by an operating system, and different operating systems implement congestion control differently. For example, one operating system might use one algorithm for performing congestion control whereas a different operating system might implement a different algorithm for the same purpose. Even a single operating system can implement different congestion control algorithms, and the ones that are implemented can be configurable to exhibit different behaviors.

Generally, different congestion control algorithms can produce different congestion control effects. Often, different congestion control algorithms are designed to achieve different objectives. For example, one congestion control algorithm might be configured to produce an optimal user experience from a server-based service for a client application that is operating on a client system across a wide area network (WAN). Such an algorithm is geared for reducing congestion in the WAN traffic but not necessarily in the traffic that flows between two servers of the service provider on a local area network (LAN). Another congestion control algorithm might be configured to perform congestion control on the LAN traffic and not on the WAN traffic. Another congestion control algorithm might be configured to maximize the data transmission from a particular network interface card (NIC) for a particular application using that NIC. Many different configurations of congestion control algorithms exist, and many more are possible depending upon the circumstances.

When a tenant in a datacenter operates a VM on a server, the VM may be operating on the server with other VMs, the tenant may be collocated on the server with other tenants, or a combination thereof. The illustrative embodiments recognize that because congestion control is implemented by the operating system of each VM individually, potentially each VM can be configured to perform congestion control in a manner that is most suitable for that VM.

The illustrative embodiments further recognize that the congestion control needed to operate a datacenter's data network can be different from the type and/or amount of congestion control performed by a VM executing therein. Furthermore, because of the localized nature of the presently available congestion control, a datacenter operator may not even know the type or amount of congestion control performed by the VMs operating in the datacenter.

The illustrative embodiments further recognize that changes, updates, patches, and other modifications to the TCP/IP stack can affect the congestion control function implemented therein. Not every VM may apply a patch, perform an update, or make the changes to their TCP/IP stacks. In some cases, the life of a VM may not warrant the change, whereas in other cases, an administrator of the VM may be unaware of the change or may ignore the change.

As relates to congestion control, many tenants are concerned with user experience with the data traffic that travels on the datacenter network and crosses the datacenter boundary between servers inside the datacenter and client machines outside the datacenter (also known as North-South traffic). However, the illustrative embodiments recognize that the majority of data traffic flowing over the datacenter network is actually between data processing systems within the datacenter (also known as East-West traffic). Thus, here is an example reason why a datacenter's congestion control concerns might be different from a tenant's congestion control concerns, warranting different approaches to congestion control. Many other reasons and cases exist where a datacenter's congestion control concerns might be different from a tenant's congestion control concerns, requiring different congestion control methodology to be implemented at the datacenter-level than the methodology implemented in one or more VMs operating in the datacenter.

Given the present method of congestion control, where the congestion control function is performed and controlled by the VMs, performing congestion control at a datacenter-level to achieve a datacenter's congestion control objectives is very difficult, and in many cases impossible.

Thus, the illustrative embodiments recognize that a problem exists in performing datacenter-level congestion control. The illustrative embodiments recognize that a solution is needed for this problem where the solution operates in conjunction with a VM's congestion control mechanism; by observing the VM's congestion control operation, flow, or a combination thereof; with or without the knowledge of the VM that a networking device or system in the datacenter is also operating a congestion control function; or possesses some combination of these and other features as described herein.

SUMMARY

The illustrative embodiments provide a method, system, and computer program product. An embodiment includes a method that computes, at an application executing in conjunction with a vSwitch in a host system, using a period measured by a timer and a number of received packets acknowledged in response packets counted by a counter, a CWND value corresponding to a flow from a VM, the timer being associated with a packet of the flow. The embodiment stores, in a field in a response packet received from a receiver of the flow, the response packet corresponding to a packet in the flow, the CWND value, the field being designated for carrying a RWND value, the storing forming a modified response packet.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
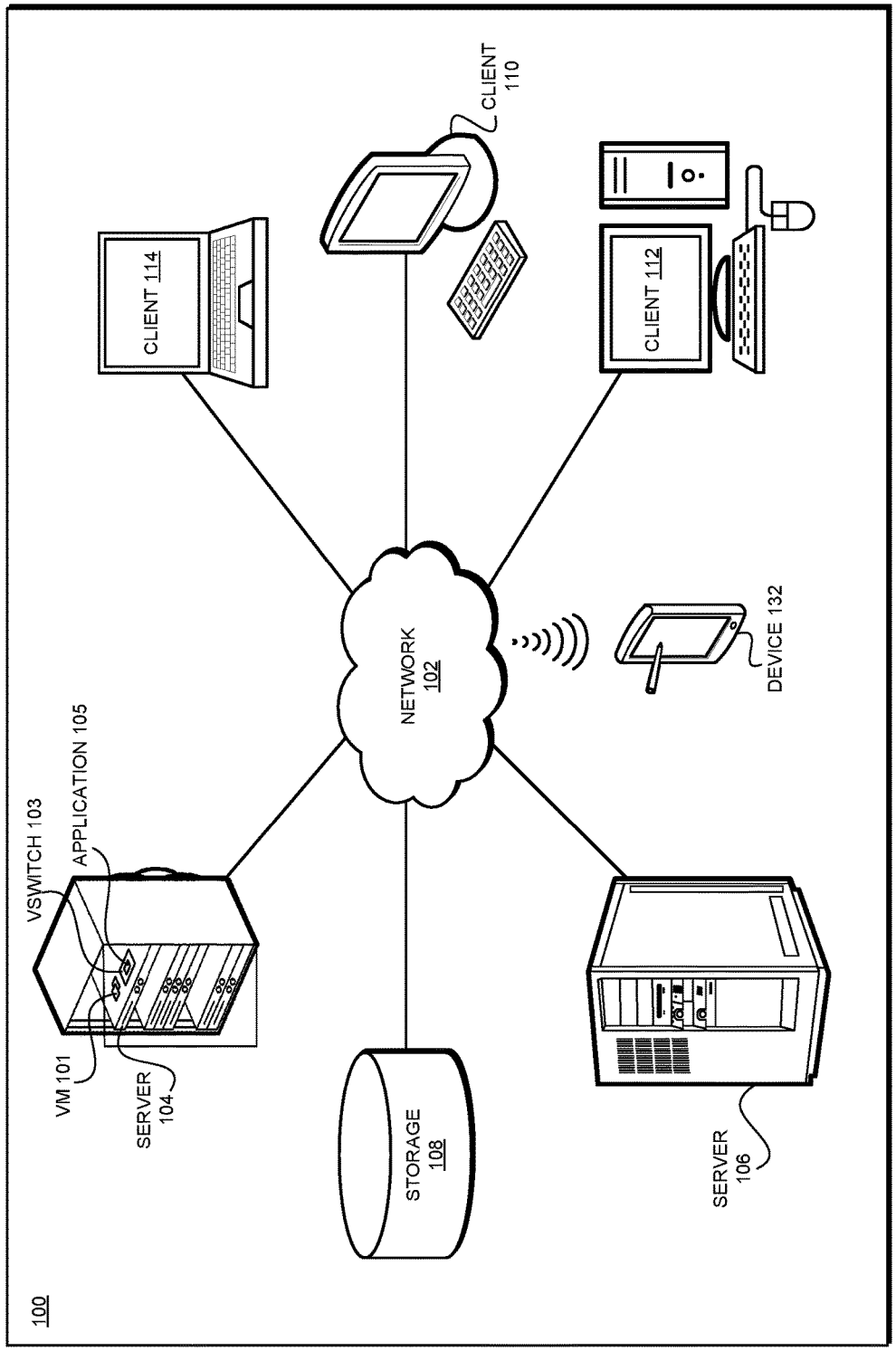
FIG. 1 depicts a block diagram of a network of data processing systems in which illustrative embodiments may be implemented.

The illustrative embodiments used to describe the invention generally address and solve the above-described problems and other problems related to performing congestion control at the datacenter-level, outside a VM executing in the datacenter, and at a device or a system that interfaces with the datacenter network.

An embodiment can be implemented as a software application. The application implementing an embodiment can be configured as a modification of an existing virtual switch (also referred to herein as a vSwitch), as a separate application that operates in conjunction with an existing vSwitch, a standalone application, or some combination thereof. A vSwitch can also be implemented on a network interface card (NIC) in the form of software executing on the NIC and utilizing the computing resources allocated to or configured on the NIC.

A virtual switch or vSwitch is a virtual networking component that operates in a manner similar to a physical networking switch device. For example, a vSwitch determines a packet or frame's destination and provides the destination address and port-based packet/frame forwarding function to the interfaces utilizing the vSwitch. Unlike a physical switch, which is a hardware device, a vSwitch is an instantiation of a virtual object from the execution of software designed to operate in the manner of a physical switch.

As an example, one or more VMs executing on a host data processing system can be configured to interface with a vSwitch executing on the host. The vSwitch receives data packets from the interfacing VMs and sends the packets to the datacenter network with which the vSwitch also interfaces. Similarly, the vSwitch receives data packets from the datacenter network and sends the packets to the appropriate interfacing VM destination. While the VMs can be under the administrative control and configuration of one or more tenants collocated or co-hosted on the host, the vSwitch on the host is outside such VMs, outside the administrative control and configuration of the tenants, and can be administrated and configured by a datacenter administrator.

Presently, vSwitches do not perform a congestion control function. An embodiment described herein improves a vSwitch, to form an improved vSwitch, where the improved vSwitch is enabled with one or more features of the embodiment that are usable in congestion control at the datacenter-level.

Within the scope of the illustrative embodiments, a packet is outbound if the packet is directed out of a VM to a network for delivery to a destination application somewhere else on the network. Conversely, an inbound packet is a packet that is received from a network and is directed towards a destination application within the VM. In other words, an outbound packet is transmitted by the VM and an inbound packet is received by the VM.

One embodiment receives a set of outbound packets in an outbound flow (F) from a VM. The embodiment associates a timer with a packet in the set. The timer associated with a packet measures an elapsed period between the time the packet is received at the embodiment from the VM for sending to the network and the time when (i) either an inbound packet corresponding to the packet is received at the embodiment for delivery to the VM, or (ii) some other confirmation of the successful transmission of the outbound packet on the network is received at the embodiment.

An acknowledgement packet (ACK) is a non-limiting example of an inbound packet corresponding to the outbound packet. One embodiment associates a timer with each outbound packet. Another embodiment associates a timer with some outbound packets where the packets are selected according to a rule. Regardless of the manner in which an embodiment associates the timers with one or more packets in flow F, the embodiment transmits the packets of flow F over the datacenter network.

An embodiment receives a set of inbound packets in an inbound flow (A) from the datacenter network for the VM. Inbound flow A includes packets corresponding to the packets in outbound flow F. The embodiment further associates a counter with inbound flow A. For example, if flow A comprises ACK packets, the counter tracks the sequence numbers acknowledged in the ACKs received in flow A corresponding to the set of packets in flow F. The embodiment sends the inbound packets of flow A to the VM. Generally, an ACK packet is cumulative in nature, and therefore an ACK packet may acknowledge multiple outbound packets. The counter tracks the number of bytes/packets acknowledged by the response packets. For example, TCP ACK packets acknowledge the largest sequence number (which is in bytes) that has been received thus far. For example, assume that outbound packets 1, 2, 3, 4, and 5 all get sent from a sender, but packet 3 gets lost in the network. If the receiver sends one ACK per packet, then a response flow will have the following ACKs (assuming one ACK per received packet): 1, 2, n/a (i.e., packet 3 is lost), 2 (ACK for packet 4 saying that the last packet received in sequence was packet 2), 2 (ACK for packet 5 saying that the last packet received in sequence was packet 2). Thus, the contents of the ACKs are used in the counting described herein. A counter is kept on the number of bytes or packets acknowledged in the ACKs. For the clarity of the description and without implying any limitation, an ACK packet is regarded as acknowledging a number of received outbound packets. A particular implementation of an embodiment can adapt the embodiment to count the number of outbound bytes received at the receiver in a similar manner and within the scope of the illustrative embodiments.

An embodiment uses one or more periods measured by the corresponding one or more timers associated with the corresponding one or more packets in flow F, and the contents of the inbound packets in flow A, to compute a congestion window value.

A congestion window (CWND) is maximum number of packets that can be transmitted over a given link without incurring a packet loss greater than a threshold amount of packet loss, a packet delivery delay greater than a threshold amount of delay, or both. For example, when the threshold amount of packet loss is set to zero and the threshold delay is set to a negligible value, the CWND is the number of packets that can be transmitted over a link without any packet loss and without any (significant) delay. Among other factors, a congestion window is dependent upon network-related conditions, including but not limited to the health of a link, the amount of traffic over the link, and a size of a packet queue at a networking device or component.

The embodiment saves the computed CWND value for flow F. The CWND value is the maximum number of packets from the VM in a particular flow, e.g., flow F in the present example, that the embodiment expects to be able to transmit over the datacenter network without incurring undesirable amount of delay or packet loss.

The saved CWND is a congestion window of the vSwitch as relates to the flow from the VM. The CWND has been computed based on the flow produced by the VM according to the congestion control algorithm operating in the VM. Thus, even though unknown to the VM, the saved CWND is in coordination with the VM's congestion control algorithm, and is usable in a congestion control algorithm configured to operate in the vSwitch at the datacenter-level according to an embodiment. For example, if the CWND of the VM's congestion control algorithm is smaller than or equal to the CWND of the vSwitch, the operation of the datacenter-level congestion control will be transparent to the VM and the VM will not see any adverse effect of the datacenter-level congestion control. If the CWND of the VM's congestion control algorithm is greater than the CWND of the vSwitch, the operation of the datacenter-level congestion control will cause the VM to experience packet loss or delay, which in turn will cause the VM to shrink or reduce its own CWND.

For example, as described herein, an embodiment drops all packets over the CWND computed in the vSwitch. As also described herein, another embodiment overwrites a receiver advertised window value in the ACK in order to make the VM reduce the number of packets it sends or else the embodiment drops any packets from the VM that exceed the overwritten receiver advertised window value. Eventually, the CWND of the VM's congestion control algorithm will become smaller than or equal to the CWND of the vSwitch, and the datacenter-level congestion control will be transparent to the VM.

There are circumstances where certain features are needed for congestion control at the datacenter-level. As a non-limiting example, consider the Explicit Congestion Notification (ECN) feature used for adding path congestion information within the packets traversing a network path. An ECN-enabled sender networking component in a datacenter sets an "ECN-capable" flag in a packet passing through the sender networking component. As the packet passes other networking components on the network path to the packet destination, such other networking components add or set "congestion encountered" data bits in the packet that has the ECN-capable flag set if such other networking component in fact is experiencing congestion. When the packet reaches the destination, if the destination is also ECN-enabled, the destination networking component echoes the ECN-related "congestion encountered" bits in the response packet. Using ACK in TCP only as a non-limiting example, in TCP ACK, when the response packet reaches the sender networking component, the sender networking component reads the ECN-related bits to determine the amount, nature, of congestion, or some combination thereof, from the congestion encountered bits.

If congestion control is operable at the datacenter-level, then ECN-enabled networking components can easily exchange congestion information using the "ECN-capable flag and ECN-related data in the congestion encountered bits. However, because congestion control is under the control of the VMs, the VMs may or may not implement the ECN feature. In fact, in most cases, the VMs forego implementing the ECN feature. As a result, the congestion control at the datacenter-level in the datacenter network has to operate without the benefit of the ECN feature.

An embodiment solves this and other similar problems related to features that are not implemented in a VM's congestion control method but are usable for congestion control at the datacenter-level. The operations of certain embodiments are described with respect to the ECN feature but are not intended to be limited to just implementing the ECN feature in the described manner. From this disclosure, those of ordinary skill in the art will be able to conceive many other features that can be similarly implemented using the described operations and such other features and such adaptations of the embodiments are contemplated within the scope of the illustrative embodiments.

The embodiment receives an outbound packet from a VM. The embodiment executing at a sender vSwitch sets the ECN-capable flag in the outbound packet and sends the thus-modified packet to the datacenter network. The ECN-enabled packet traverses the datacenter network and collects congestion encountered data in the ECN-related bits.

Assume that the receiver networking component which receives the modified packet at the packet destination is ECN-enabled. For example, the receiver networking component may be another vSwitch operating an embodiment. As another example, the receiver networking component may be otherwise configured to participate in ECN by echoing the ECN-related bits.

The receiver networking component echoes the ECN-related bits in a response packet directed at the VM. It is also possible to aggregate many ECN-related bits corresponding to many inbound packets into one outbound response packet. This information can also be loaded or piggybacked into an already planned response packet instead of sending a dedicated packet just to communicate this information. The response packet traverses the datacenter network to arrive at the sender vSwitch. The embodiment reads the ECN-related bits to collect the congestion encountered data. this congestion encountered data is now available and usable for datacenter-level congestion control even though the congestion control method implemented in the VM does not implement the ECN feature.

In some circumstances, hiding the ECN activity if the vSwitch from the VM may be desirable. In such circumstances, before sending the response packet to the VM, an embodiment removes, deletes, erases, overwrites, or otherwise obfuscates the ECN-capable flag bit(s), ECN-related bit(s) carrying the congestion encountered data, or both, in the response packet. The thus-modified response packet, when it reaches the VM, contains no indication that outbound packet sent by the VM and/or the actual response packet sent by the receiver was used for the ECN feature. An embodiment operating at the receiving system similarly ensures that a receiver of the outbound packets would also not know that the outbound packets were manipulated to enable the ECN feature.

In some cases, performing different congestion control on different flows may be desirable. Presently, if different flows originate from the same VM, the same congestion control algorithm in the VM operates to provide the congestion control function for the different flows. Even if congestion control is performed somewhere in the datacenter network, the congestion control algorithm operating there applies the same congestion control to all the flows passing through that point.

The possibility of different flows originating from different VMs, which in turn implement different congestion control algorithms—resulting in different congestion controls on their respective flows, may still not solve the problem completely. For example, even when the flows are from different VMs, which may have applied different congestion controls to their respective flows, there may be a need to apply still different congestion controls to such different flows. For example, a single VM can have both north-south and east-west traffic, which have different congestion control needs.

An embodiment receives a first flow (F1). The embodiment identifies a set of flow parameters related to F1. For example, a flow parameter may be a destination identifier in a packet in the flow. Some other example flow parameters include but are not limited to a priority of a process generating the flow, a level of operation or performance associated with the flow or a source application of the flow, a rule or policy affecting the flow or related to an aspect of the flow, a time of the occurrence of the flow, and the like. These examples of flow parameters are not intended to be limiting. From this disclosure, those of ordinary skill in the art will be able to conceive many other flow parameters that are usable in a manner described herein, and the same are contemplated within the scope of the illustrative embodiments.

Based on one or more flow parameters from the set of flow parameters extracted from flow F1, the embodiment determines, such as by using a rule or other implementation of logic, that a particular congestion control algorithm, e.g., congestion control algorithm 1, will be suitable for congestion control with F1. In a similar manner, the embodiment extracts from different flows different corresponding sets of flow parameters and identifies a particular congestion control algorithm from a set of congestion control algorithms available to the embodiment, to use in congestion control with another flow, e.g., with flow F2. The congestion control algorithms used with F1 and F2 can be different even where F1 and F2 originate from the same VM, or even the same process within the same VM.

Thus, potentially different congestion controls can be applied to different flows. For example, a result of applying different congestion controls to different flows may be that flow F1 has a CWND that is different from the CWND that is applicable to flow F2.

A congestion control algorithm executing in a VM computes a number of packets to transmit in an outbound flow from the VM to the vSwitch in the VM's host. The computation of this number is often based on a receiver advertised window available in an inbound packet of an inbound flow.

A receiver advertised window (RWND) is the maximum number of packets that a particular receiver of a particular flow can successfully receive in the flow without dropping a greater than a threshold number of packets, without requiring retransmission of a greater than another threshold number of packets, or both. For example, when the threshold number of dropped packets is set to zero and the threshold number of packet requiring retransmission is set to zero, the RWND is the number of packets that the receiver can receive in a flow without dropping any packets and without requiring any packets to be retransmitted. Among other factors, RWND is dependent upon receiver-related conditions, including but not limited to the receive rate of which the configuration of the receiver is capable, and a size of a packet queue at a networking device or component associated with the receiver.

Thus, a VM's congestion control algorithm can read the RWND populated in an inbound packet received from a receiver in response to a previously transmitted outbound packet. RWND is used in a logically separate process known as flow control. The congestion control process sets the CWND value. The flow control process sets the RWND value. The sending operation of a sender's TCP/IP stack is then bound by these two independent processes, to wit, the minimum of CWND and RWND: min(RWND, CWND).

An embodiment executing in a vSwitch computes a CWND at the vSwitch level, such as in the manner described herein. If the number of outbound packets from the VM exceed the vSwitch's CWND, the additional packets can cause undesirable effects on the VM's performance. For example, sending more than the CWND number of packets hurts the VM's performance because an embodiment described herein can drop the excess packets causing retransmissions from the VM.

An embodiment enforces the vSwitch's CWND as the upper limit on the number of packets that a VM interfacing with the vSwitch should send to the vSwitch. To accomplish this enforcement, the embodiment identifies, in an inbound packet for the VM, the RWND value populated by a sender of the inbound packet (a receiver from the VM's perspective). The embodiment overwrites the RWND value in the inbound packet with the vSwitch's CWND value. The embodiment sends the thus-modified inbound packet to the VM.

Now, when the VM reads the RWND value from the modified inbound packet, the VM will find the vSwitch's CWND value. Thus, if the VM uses the RWND value as the upper bound for the number of packets to transmit to the vSwitch, the number will be bound by the vSwitch's CWND value without the VM's knowledge that the number actually comes from the vSwitch's CWND value and not the receiver's RWND value. This modification of the packet does not require any change in the operation of the VM, and the VM remains unaware of the datacenter-level congestion control being performed in this manner.

There can be cases where the VM has been implemented in such a way that the VM ignores the value at the RWND location in the packet and determines the number of packets to send to the vSwitch in some other way. An embodiment polices for such variations in the VM.

After having overwritten the RWND value with the vSwitch's CWND value, the embodiment counts the number of packets received from the VM in a future flow. If the number does not exceed the vSwitch's CWND value, then the embodiment considers the VM to be in compliance with the datacenter-level congestion control performed by the embodiment. If the number exceeds the vSwitch's CWND value, then the embodiment considers the VM to be not in compliance with the datacenter-level congestion control performed by the embodiment.

When a VM is not in compliance, the embodiment allows only the vSwitch's CWND number of packets from the flow to proceed to the datacenter network and drops the extra packets received in the flow. For example, suppose that the vSwitch's CWND value is 10, and the RWND value of a receiver is 14. The embodiment overwrites 14 with 10. In a future flow, the embodiment counts 17 packets being transmitted by the VM. The embodiment allows 10 packets to go to the datacenter network and drops the remaining 7 packets.

As described herein, an embodiment can enforce CWND as the upper bound on the number of packets a VM can send in a flow. In some cases, these upper bounds may have to be changed differently for different flows. As a non-limiting example, if flow F1 has a higher priority than flow F2, then allowing a larger CWND window for F1 as compared to F2 may be desirable.

An embodiment computes a normalized value ($\beta$) for a flow. As a non-limiting example, the normalized value can be computed using the set or a subset of flow parameters, which can be obtained from a flow in a manner described herein. As a non-limiting example, the normalized values of all flows can be between 0 and 1 or any other scale of choice.

The embodiment uses the normalized value of a flow to determine an amount by which the upper limit on the number of outbound packets in the flow should be reduced. For example, assume that the vSwitch's CWND value for flow F1 (CWND1)—which acts as the upper bound on the number of packets in F1—is 10; and the vSwitch's CWND value for flow F2 (CWND2)—which acts as the upper bound on the number of packets in F2—is 8. Further assume that the normalized value of F1 is 0.8 and the normalized value of F2 is 0.4. In one embodiment, the reduction in the vSwitch's CWND value for a flow is an inverse function of the flow's normalized value. In other words, the higher the flow's normalized value, the smaller the reduction in the flow's upper bound. Thus, CWND1 might be reduced from 10 to 9 due to F1's normalized value being high on the scale of 0-1 whereas CWND2 might be reduced from 8 to 2 due to F2's normalized value being comparatively lower on the same scale.

In some cases, learning the congestion control algorithm or the type of the congestion control algorithm employed by a VM is useful. For example, a datacenter can adjust or change a configuration of a component, a pricing of a tenant, a priority of a process, a host system, and many other factors if the datacenter can learn how a VM is performing congestion control. Because a congestion control algorithm is localized within the VM's implementation, a datacenter cannot know in many cases the particular congestion control algorithm or the particular type of congestion control algorithm executing in the VM.

An embodiment solves this problem and allows a datacenter to learn the congestion control algorithm or the type of the congestion control algorithm that a particular VM is executing within the VM. To provide this insight, the embodiment receives an outbound flow from the VM in question, the VM having generated the flow under the control of the congestion control algorithm executing therein.

The embodiment configures a set of different congestion control algorithms of various types to execute in the vSwitch or be accessible from the vSwitch. The embodiment executes some or all of the different congestion control algorithms in the set, each of which computes a number of packets that should be present in a flow from the VM. For example, each of the different congestion control algorithms produces a corresponding CWND value. The embodiment counts the actual number of packets in the flow received from the VM.

The embodiment determines whether any of the CWND values produced from any of the different congestion control algorithms matches the actual number of packets within a tolerance value. If a CWND value produced from a congestion control algorithm matches the actual number of packets within the tolerance value, the embodiment concludes that the congestion control algorithm which produced the matching CWND is the congestion control algorithm, or is a congestion control algorithm of the type, that is used in the VM that generated the flow (a positive result). If multiple congestion control algorithms match, then the algorithm can continue to iterate over multiple round-trips to converge on a solution. If no CWND value produced from any congestion control algorithm matches the actual number of packets within the tolerance value, the embodiment concludes that the congestion control algorithm, or the type of the congestion control algorithm used in the VM cannot be determined (a negative result). Even in the case of a negative result, the datacenter at least learns that the VM is not operating a congestion control algorithm or congestion control algorithm type known to the datacenter, which can trigger an action as well.

One embodiment further causes an improved vSwitch to calculate a "similarity" index for a congestion control algorithm. Each time an ACK is received, a new CWND is computed in the VM (and vSwitch). The embodiment tracks the number of packets that the VM sends against the CWND computed in the vSwitch. This comparison produces a fraction [number of packets sent from the VM according to the VM-computed CWND divided by the CWND computed by the improved vSwitch]. The embodiment averages or otherwise statistically processes that fraction over time to determine how close the fraction is to 1. When the fraction approaches 1 within a tolerance value, the CWND computed at the vSwitch and the VM match within a degree that corresponds to the tolerance value.

A method of an embodiment described herein, when implemented to execute on a device or data processing system, comprises substantial advancement of the functionality of that device or data processing system towards performing datacenter-level congestion control. For example, presently available methods for congestion control are implemented by the operating system and are therefore local to the machine where the operating system executes, such as local to a VM. An embodiment provides a method by which vSwitches can be modified to perform datacenter-level congestion control by coordinating with the congestion control function and the flows of a VM. Furthermore, the datacenter-level congestion control can be performed according to an embodiment without requiring any change in the VMs communicating with the improved vSwitches or even without the VMs becoming aware that congestion control is being performed at the datacenter-level. This manner of virtual switch-based congestion control for datacenter networks is unavailable in the presently available methods. Thus, a substantial advancement of such devices or data processing systems by executing a method of an embodiment is in allowing datacenters to manage congestion in datacenter networks without relying on the congestion control functions implemented in tenant VMs.

The illustrative embodiments are described with respect to certain types of packets, flows, flow parameters, VMs, vSwitches, CWND values, RWND values, normalized values, features, priorities, congestion control operations, congestion control algorithms, types of congestion control algorithms, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
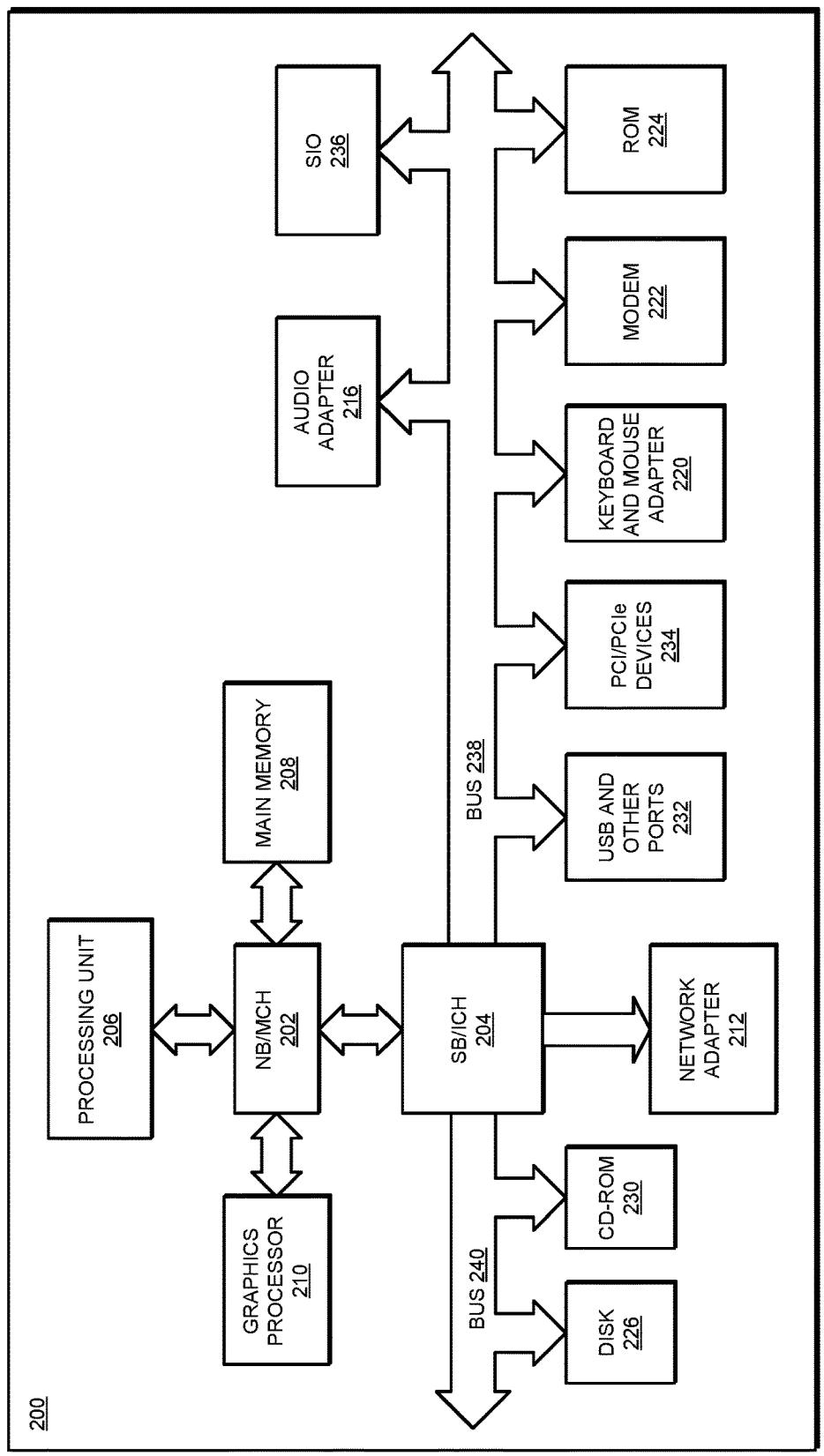
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

VM 101 is one or more VMs executing in server 104. VSwitch is an existing vSwitch implemented in server 104. Application 105 implements an embodiment described herein. Application 105 operates in conjunction with vSwitch 103 to effectively form an improved vSwitch which can provide a function of an embodiment described herein. Network 102 can be regarded as a datacenter network, which is usable for, for example, data communication between vSwitch 103 in server 104 and another vSwitch (not shown) in server 106.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
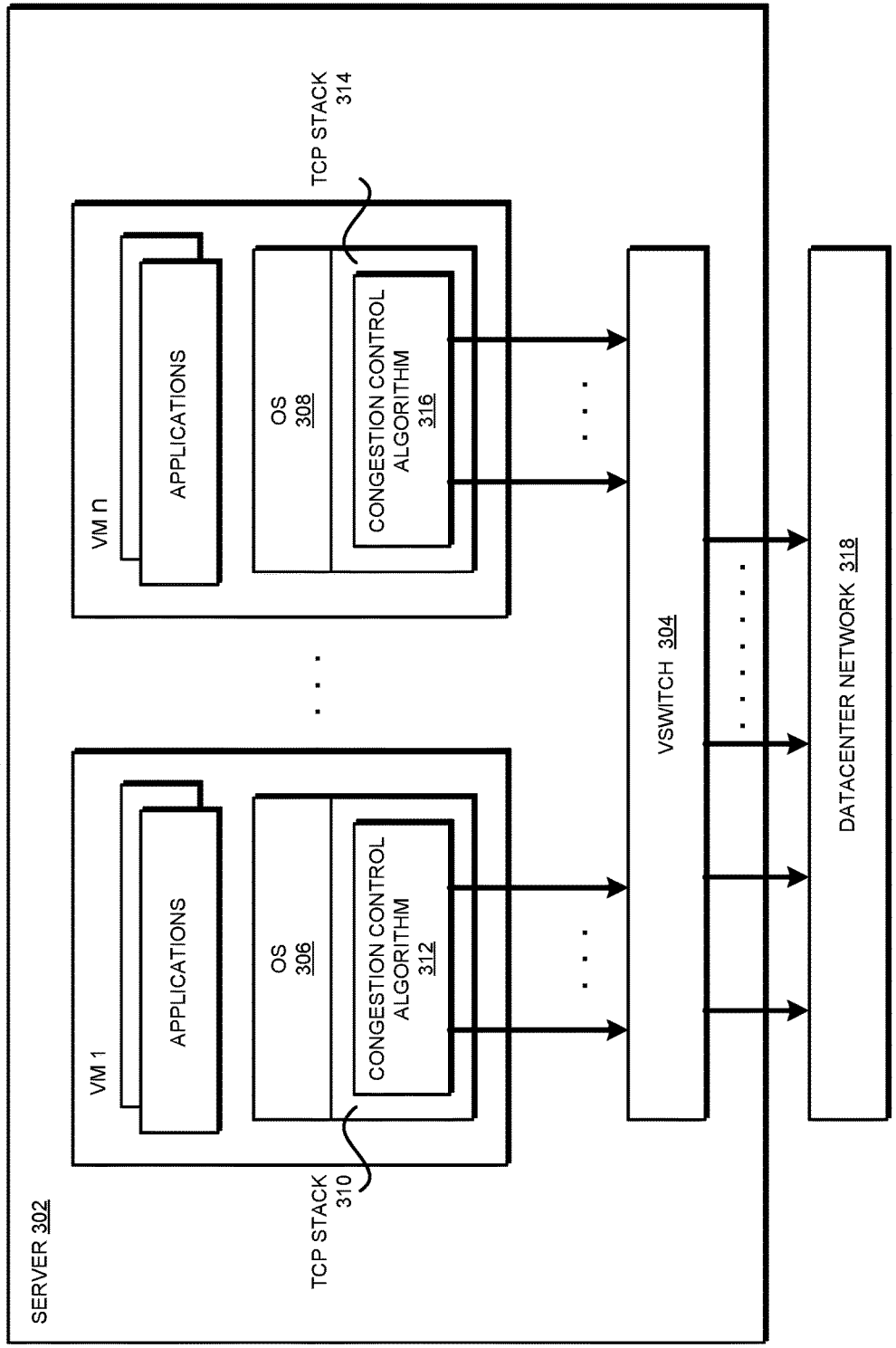
FIG. 3 depicts a block diagram of an example configuration for data communication using a vSwitch in a datacenter environment which can be improved with an illustrative embodiment.

With reference to FIG. 3, this figure depicts a block diagram of an example configuration for data communication using a vSwitch in a datacenter environment which can be improved with an illustrative embodiment. Server 302 is an example of server 104 in FIG. 1. VSwitch 304 is an example of vSwitch 103 in FIG. 1. VM1-VMn are each an example of VM 101 in FIG. 1.

Each VM operates under the control of a corresponding operating system and executes one or more application thereon. For example, VM1 includes operating system 306 and VMn includes operating system 308. Operating system 306 implements TCP/IP stack 310 in VM1, which executes congestion control algorithm 312 for managing the data flows originating from VM1. In a similar manner, Operating system 308 implements TCP/IP stack 314 in VMn, which executes congestion control algorithm 316 for managing the data flows originating from VMn.

Datacenter network 318 is an example of network 102 in FIG. 1. The data flows from VM1-VMn in server 302 are sent to vSwitch 304, which directs the data flows to datacenter network 318, which connects server 302 to other servers in the datacenter. The flows reaching datacenter network 318 in this manner are under the congestion control of their respective VMs, particularly under the control of the congestion control algorithms executing in their respective VMs. The flows reaching datacenter network 318 in this manner cause problems in datacenter-level congestion control, as described herein.

Figure 4:
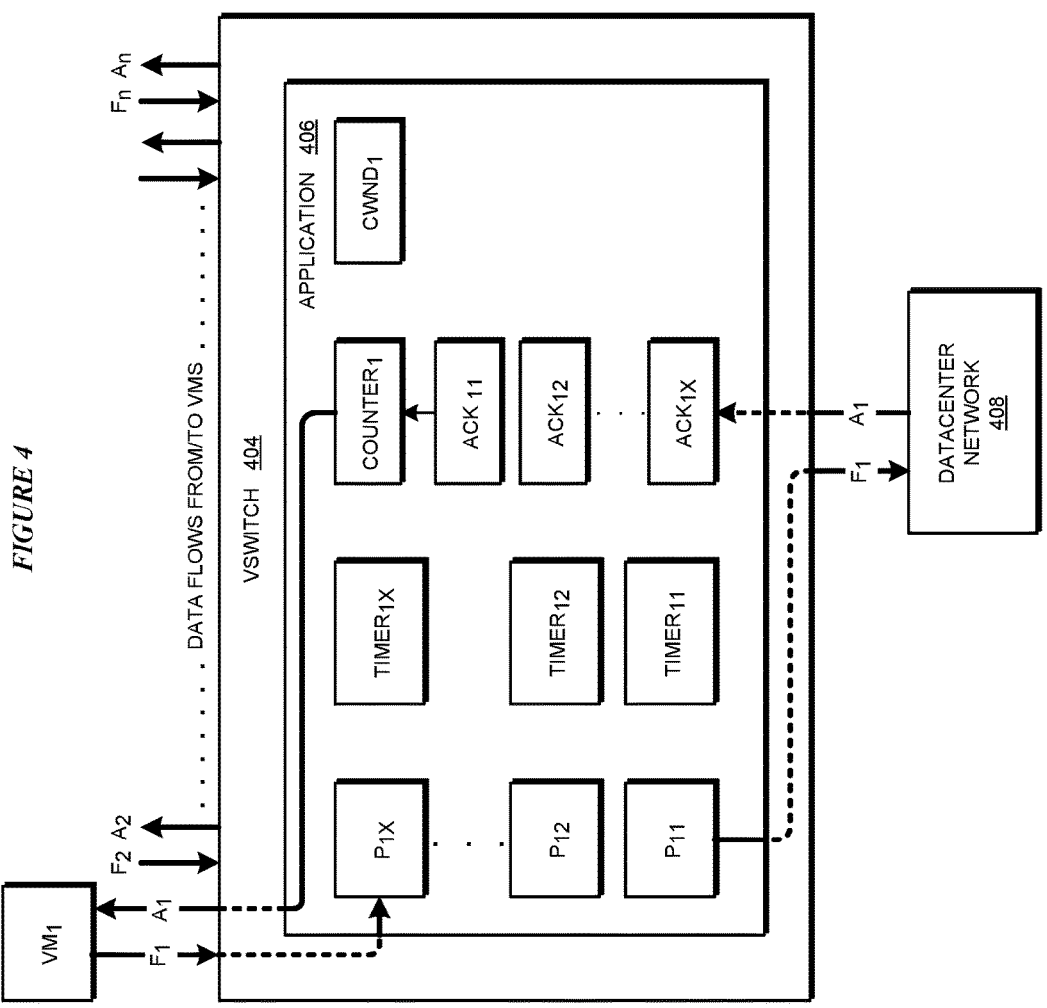
FIG. 4 depicts a block diagram of a configuration for virtual switch-based congestion control for datacenter networks in accordance with an illustrative embodiment.

With reference to FIG. 4, this figure depicts a block diagram of a configuration for virtual switch-based congestion control for datacenter networks in accordance with an illustrative embodiment. VSwitch 404 is an example of vSwitch 304 in FIG. 3. Application 406 is an example of application 105 in FIG. 1. VSwitch 404 enabled by application 406 forms an improved vSwitch as described and used herein. Datacenter network 408 is an example of datacenter network 318 in FIG. 3.

VM1 is an example of VM1 in FIG. 3. Any number of such VMs may be coupled with vSwitch 404 in a similar manner. F1 is an outbound flow from VM1, and so on. Similarly, Fn is an outbound flow from VMn. A1 is an example inbound flow of ACKs into VM1. The ACK packets in flow A1 correspond to the outbound packets in the outbound flow F1, and so on. Similarly, "An" is an example inbound flow of ACKs into VMn.

Application 406 receives packets P11, P12, . . . P1$x$ in flow F1 from VM1. Application 406 associates a timer with a packet in flow F1, such as timer 11 with P11, timer 12 with P12, timer 1$x$ with P1$x$. Application 406 associates the timers with all or some packets of flow F1 in this manner. Application 406 allows flow F1 to proceed to datacenter network 408.

Application 406 receives flow A1 from datacenter network 408 for VM1. Flow A1 includes ACK11, ACK12, . . . ACK1$x$, corresponding to P11, P12, . . . P1$x$, respectively. Application 406 uses counter1 to count the number of packets ACKed by the ACKs received in flow A1. Application 406 allows flow A1 to proceed to VM1.

Application 406 computes a CWND value for vSwitch 404 for applying to flow F1 from VM1 (CWND1). Application 406 uses CWND1 value to perform congestion control function relative to future F1 flows at the datacenter-level.

Figure 5:
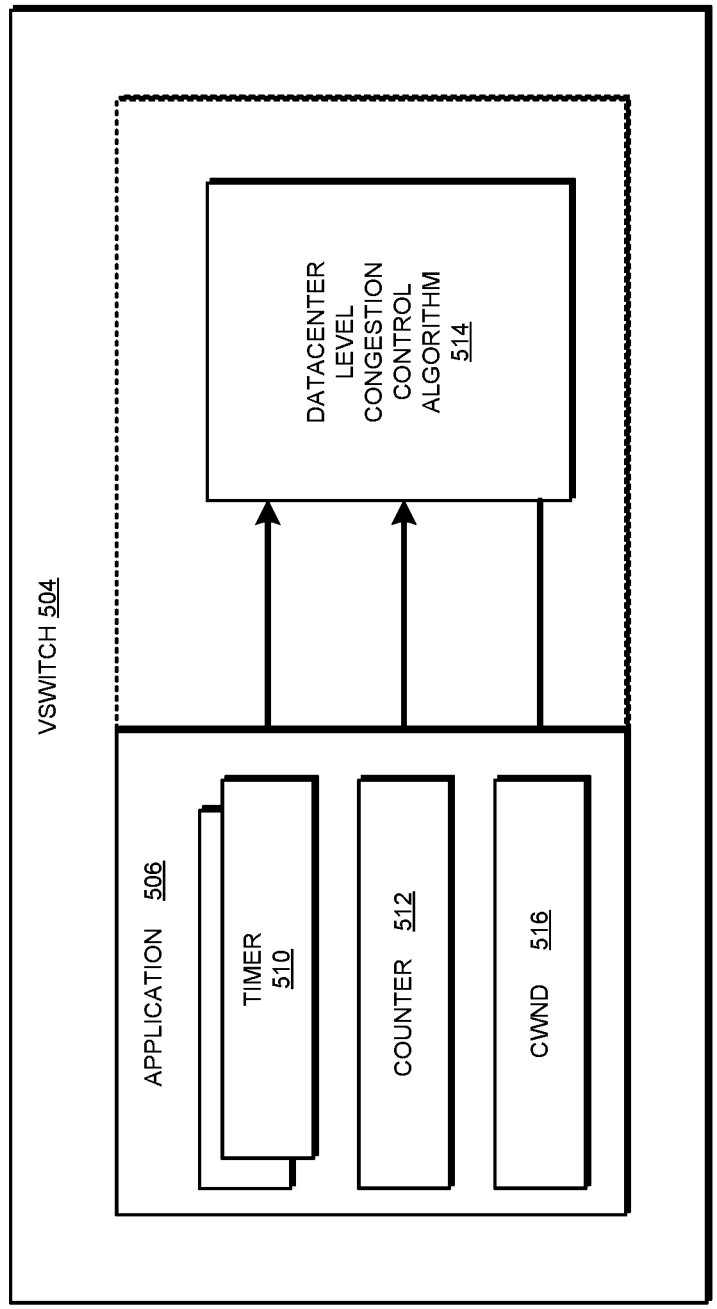
FIG. 5 depicts a block diagram of one example configuration for computing a vSwitch-level CWND value in accordance with an illustrative embodiment.

With reference to FIG. 5, this figure depicts a block diagram of one example configuration for computing a vSwitch-level CWND value in accordance with an illustrative embodiment. VSwitch 504 is an example of vSwitch 404 in FIG. 4. Application 506 is an example of application 406 in FIG. 4. VSwitch 504 enabled by application 506 forms another improved vSwitch as described and used herein.

Each of timers 510 corresponds to a timer, e.g., timer11, timer12, . . . and timer1$x$ in FIG. 4. Timers 510 store the periods measured by their corresponding timers in FIG. 4. Counter 512 is an example of counter1 in FIG. 4. The value stored in counter 512 is the count maintained in counter1.

Application 506 supplies the counter value from counter 512, and one or more periods from timers 510 to congestion control algorithm 514. Congestion control algorithm 514 may be executing in vSwitch 504 or may be executed from vSwitch 504 by application 506. Congestion control algorithm returns the CWND1 value of FIG. 4, which application 506 stores as CWND 516.

Figure 6:
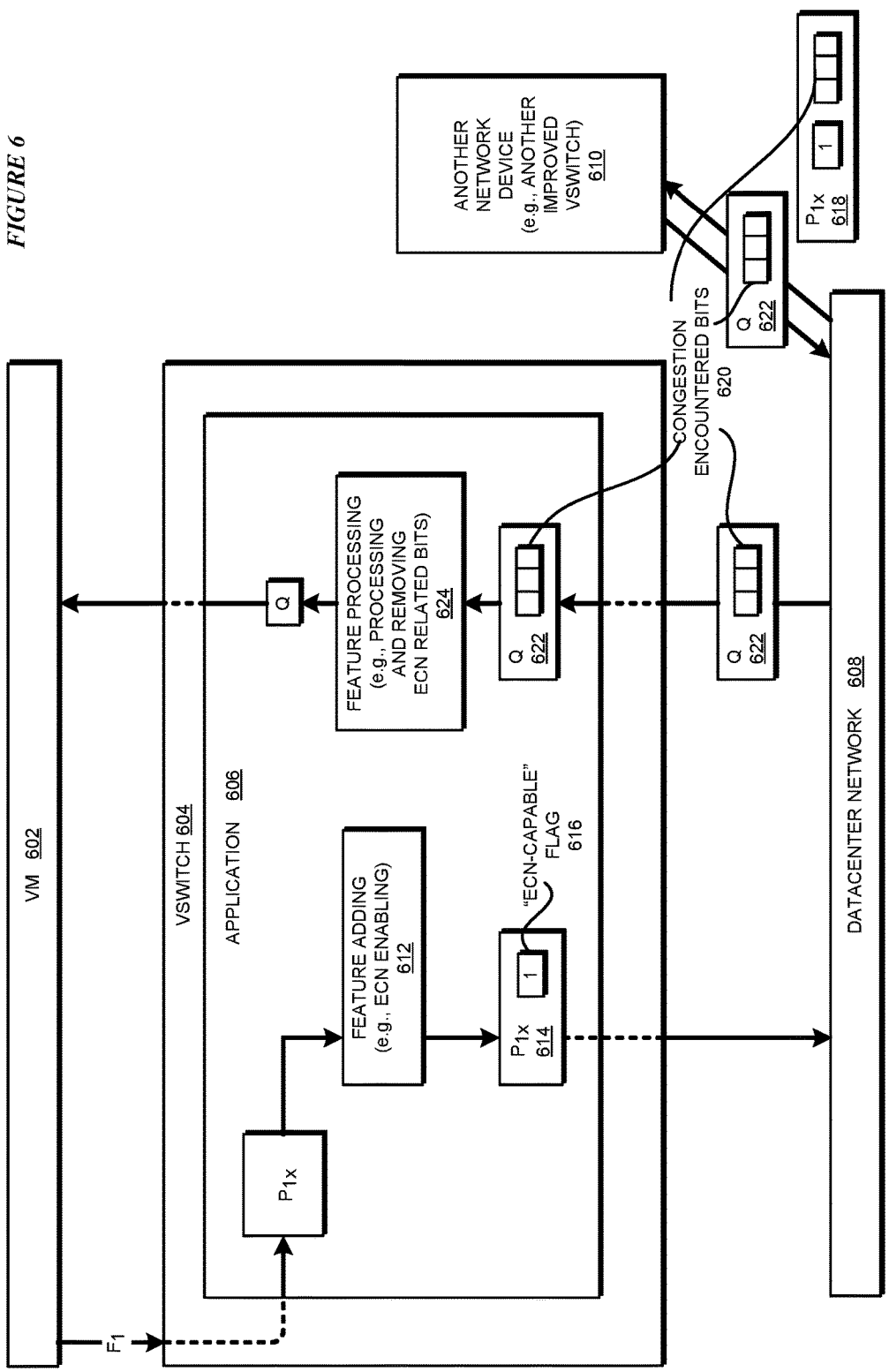
FIG. 6 depicts a block diagram of an example configuration for enabling a feature for congestion control at the datacenter-level in accordance with an illustrative embodiment.

With reference to FIG. 6, this figure depicts a block diagram of an example configuration for enabling a feature for congestion control at the datacenter-level in accordance with an illustrative embodiment. VM 602 is an example of VM1 in FIG. 4. vSwitch 604 is an example of vSwitch 504 in FIG. 5. Application 606 is an example of application 506 in FIG. 5. VSwitch 604 enabled by application 606 forms another improved vSwitch as described and used herein.

Flow F1 includes outbound packets (P), such as packet P1$x$, from VM 602. Response packets (Q) are inbound packets sent to VM 602 by a receiver of packet P1$x$. Packets P and Q flow over datacenter network 608. Datacenter network 608 is an example of datacenter network 408 in FIG. 4. As an example, the receiver uses network device 610, which either also executes an application similar to application 606 therein, or is otherwise configured to support the feature in question, e.g., the ECN feature. The operations of application 606 are described with respect to the ECN feature only as a non-limiting example, as described herein.

Application 606 implements operation 612. Operation 612 is an ECN enabling operation, which receives packet P1$x$ and enables, adds, sets, or otherwise activates a bit or bits designated for indicating an ECN-capable flag or status of vSwitch 604. As a non-limiting example, operation 612 produces modified packet P1$x$ (614) which shows ECN-capable flag bit 616 set to value "1".

Modified packet 614 traverses datacenter network 608 during which traversal, modified packet 614 changes into modified packet 618. Modified packet 618 includes one or more locations or fields 620—each location or field comprising one or more bits—in which an indication of encountering a congestion can be recorded by a networking component in datacenter network 608 through which packet 614 passes. For example, packet 614 might pass through five networking components, three of which might be experiencing congestion. Each of the three congested networking components set or record a "congestion encountered" indication in one location 620.

Eventually, packet 618—including one or more locations or fields 620—reaches network device 610. Network device 610 echoes or adds the values from locations 620 from packet 618 into corresponding locations 620 in response packet Q (622). In other words, packet 622 includes a copy of locations 620 from packet 618. Packet 622 traverses datacenter network 608 and reaches application 606.

Application 606 implements operation 624. Operation 624 performs the feature processing based on the feature implemented in this manner. in the example case of the ECN feature, operation 624 reads locations 620 in response packet 622 and determines the congestion encountered values contained therein. Operation 624 modifies packet 622 to form packet 626 by erasing, deleting, or otherwise making the data of locations 620 unusable or meaningless to VM 602 in packet 626. Application 606 sends packet 626 to VM 602.

Figure 7:
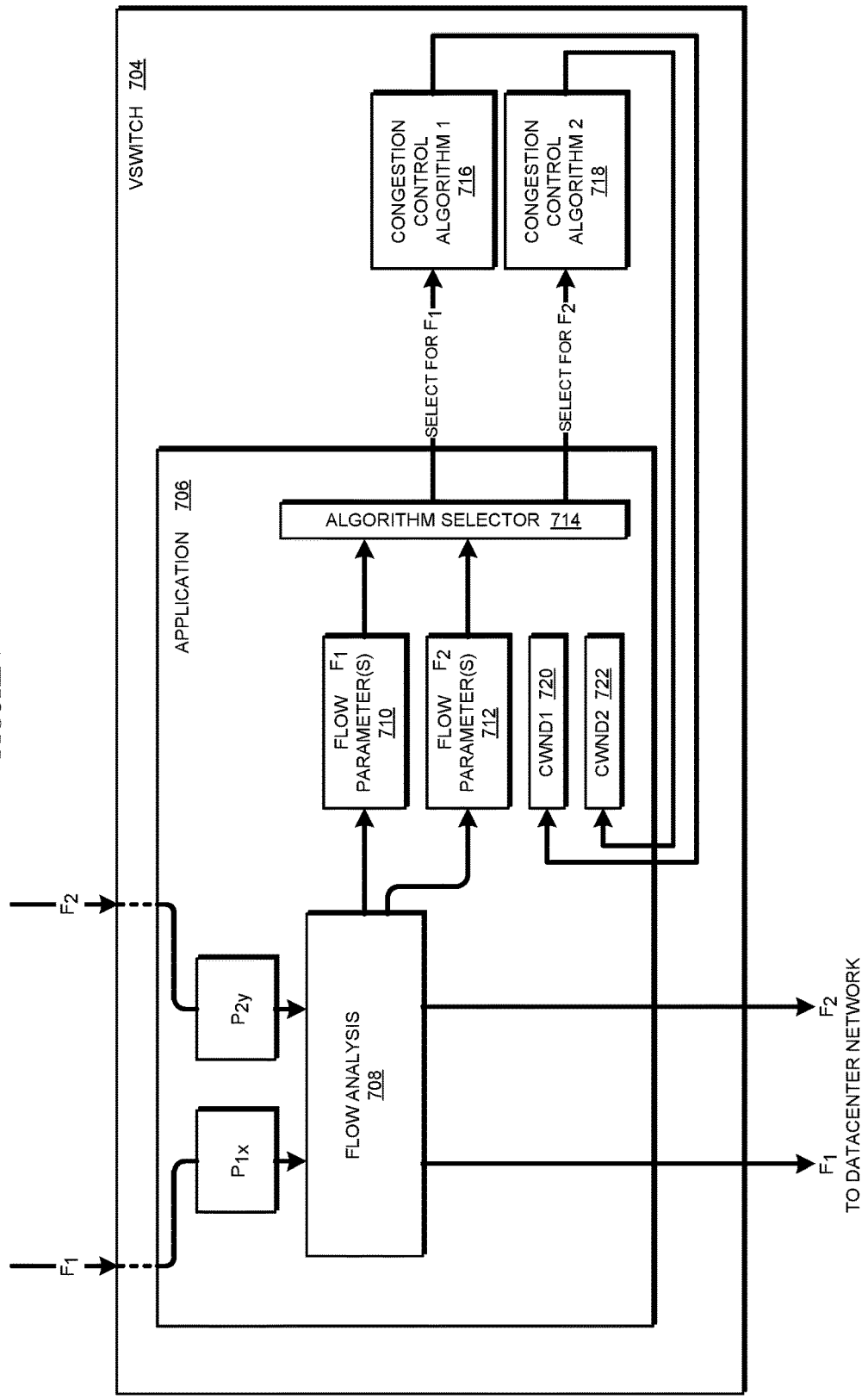
FIG. 7 depicts a block diagram of an example configuration for a flow-by-flow congestion control in accordance with an illustrative embodiment.

With reference to FIG. 7, this figure depicts a block diagram of an example configuration for a flow-by-flow congestion control in accordance with an illustrative embodiment. VSwitch 704 can be an example of vSwitch 103 in FIG. 1, vSwitch 404 in FIG. 4, vSwitch 504 in FIG. 5, or vSwitch 604 in FIG. 6, depending on how and which features are implemented in a given implementation. Similarly, application 706 can be an example of application 105 in FIG. 1, application 406 in FIG. 4, application 506 in FIG. 5, or application 606 in FIG. 6, depending on how and which features are implemented in a given implementation. VSwitch 704 enabled by application 706 forms another improved vSwitch as described and used herein.

As described herein, a need may exist to apply different congestion controls to different flows. Assume that flows F1 and F2 are outbound flows reaching vSwitch 704. Flow F1 includes outbound packets such as P1$x$, and flow F2 includes outbound packets such as P2$y$.

Application 706 implements operation 708. Operation 708 performs flow analysis on an outbound flow. For example, operation 708 performs flow analysis on flow F1 to extract set 710 of one or more flow parameters. Similarly, operation 708 performs flow analysis on flow F2 to extract set 712 of one or more flow parameters.

Operation 714 is an algorithm selector function. Operation 714 receives set 710 of flow parameters for flow F1 and uses a rule or other implementation-specific logic to determine that congestion control algorithm 716 (congestion control algorithm 1) should be selected for flow F1. Similarly, by using a rule or other implementation-specific logic, operation 714 determines that congestion control algorithm 718 (congestion control algorithm 2) should be selected for flow F2. An execution of congestion control algorithm 716 computes CWND value 720 for flow F1 (CWND1). Similarly, an execution of congestion control algorithm 718 computes CWND value 722 for flow F2 (CWND2). Application 706 allows flows F1 and F2 to proceed to the datacenter network. Application 706 uses CWND1 value to perform congestion control on future flow F1 and CWND2 value to perform congestion control on future flow F2.

Figure 8:
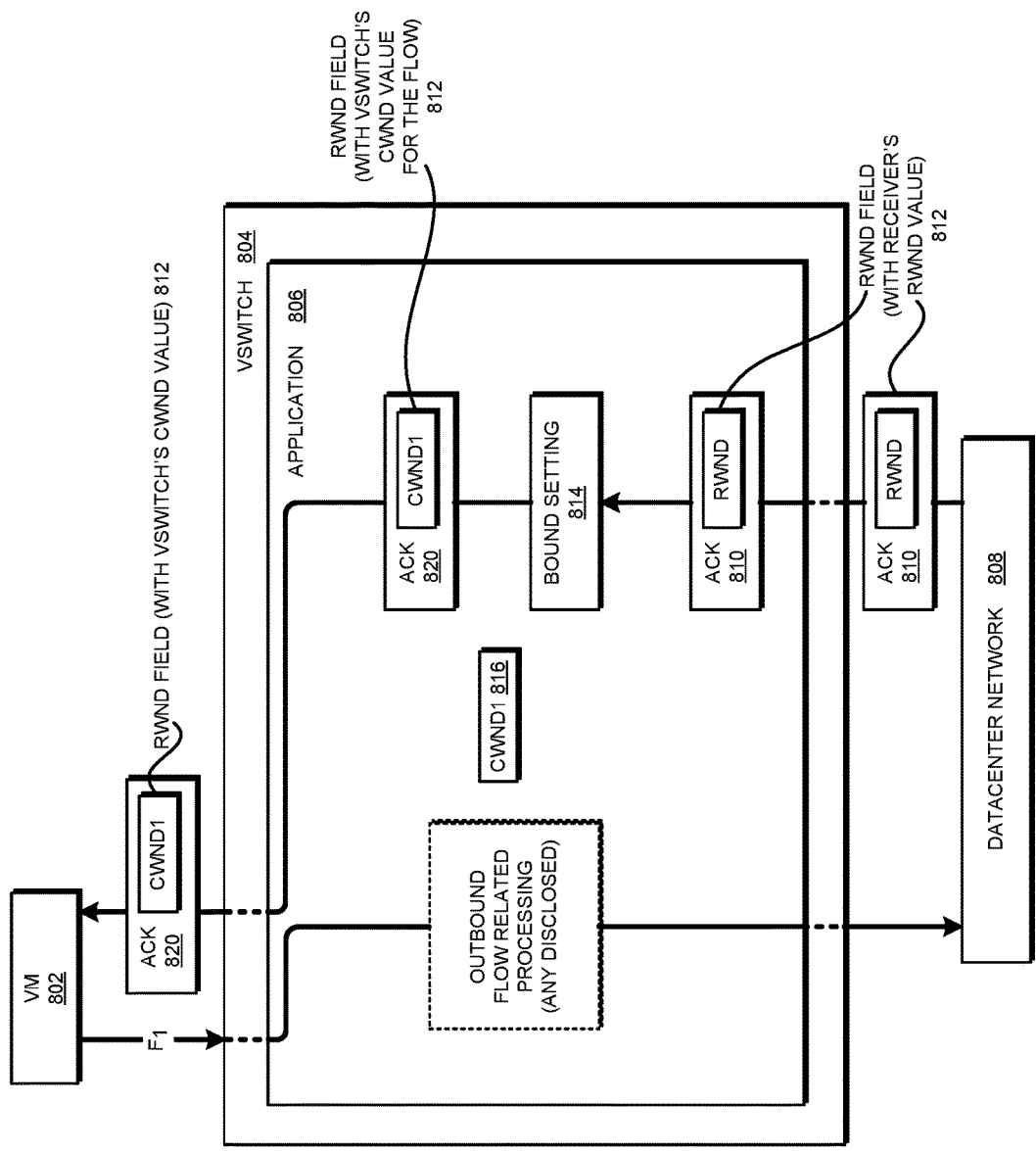
FIG. 8 depicts a block diagram of an example configuration for enforcing datacenter-level congestion control in accordance with an illustrative embodiment.

With reference to FIG. 8, this figure depicts a block diagram of an example configuration for enforcing datacenter-level congestion control in accordance with an illustrative embodiment. VSwitch 804 can be an example of vSwitch 103 in FIG. 1, vSwitch 404 in FIG. 4, vSwitch 504 in FIG. 5, vSwitch 604 in FIG. 6, or vSwitch 704 in FIG. 7, depending on how and which features are implemented in a given implementation. Similarly, application 806 can be an example of application 105 in FIG. 1, application 406 in FIG. 4, application 506 in FIG. 5, application 606 in FIG. 6, or application 706 in FIG. 7, depending on how and which features are implemented in a given implementation. VSwitch 804 enabled by application 806 forms another improved vSwitch as described and used herein.

VM 802 sends outbound flow F1 to vSwitch 804. Application 806 may, but need not apply one or more operations described herein to flow F1 before sending flow F1 to datacenter network 808.

As an example, assume that vSwitch 804 receives response packet 810 corresponding to a packet in F1. Further assume only as a non-limiting example, that response packet 810 is an ACK packet. As described herein, the sender of packet 810 (a receiver from VM 802's perspective) may provide an RWND value in location or field 812 in packet 810.

Application 806 implements operation 814. Operation 814 sets an upper bound on the number of packets VM 802 can transmit to vSwitch 804 in a future flow F1. Particularly, operation 814 overwrites the RWND value in field 812 with CWND1 value 816, which is vSwitch 804's CWND value for flow F1. CWND1 value 816 is an example of the CWND1 value in FIG. 4, CWND value 516 in FIG. 5, or CWND1 value 720 in FIG. 7, depending on the implementation. The rewriting or overwriting of field 812 produces modified response packet 820. Application 806 sends packet 820 to VM 802.

Figure 9:
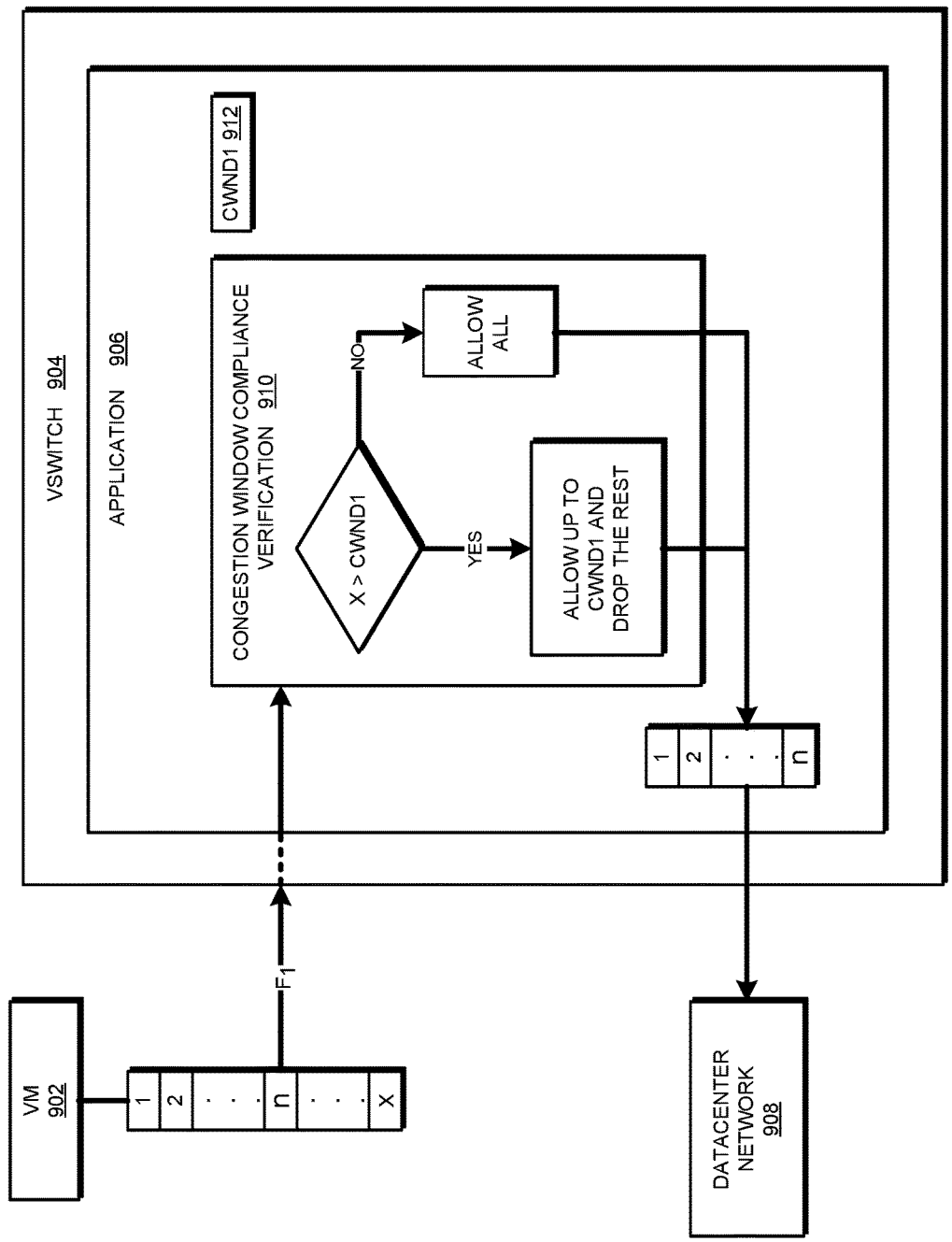
FIG. 9 depicts a block diagram of an example process of policing at the datacenter-level a VM's congestion control behavior in accordance with an illustrative embodiment.

With reference to FIG. 9, this figure depicts a block diagram of an example process of policing at the datacenter-level a VM's congestion control behavior in accordance with an illustrative embodiment. VM 902 can be an example of VM 802 in FIG. 8. VSwitch 904 can be an example of vSwitch 103 in FIG. 1, vSwitch 404 in FIG. 4, vSwitch 504 in FIG. 5, vSwitch 604 in FIG. 6, vSwitch 704 in FIG. 7, or vSwitch 804 in FIG. 8, depending on how and which features are implemented in a given implementation. Similarly, application 906 can be an example of application 105 in FIG. 1, application 406 in FIG. 4, application 506 in FIG. 5, application 606 in FIG. 6, application 706 in FIG. 7, or application 806 in FIG. 8, depending on how and which features are implemented in a given implementation. VSwitch 904 enabled by application 906 forms another improved vSwitch as described and used herein. Datacenter network 908 is an example of datacenter network 808 in FIG. 8. CWND1 912 can be an example of CWND1 816 in FIG. 8.

VM 902 sends outbound flow F1 to vSwitch 904. Flow F1 includes packets 1, 2, . . . n, . . . x, to wit, a total of x number of packets. The packet numbering in this and other examples is arbitrarily selected for the ease of description and not to imply any limitations. Application 906 receives flow F1. Application 906 implements operation 910, which performs congestion window compliance verification on outbound flows, such as on flow F1. Particularly, operation 910 determines whether the number of packets in flow F1, i.e., x, exceeds vSwitch 904's CWND value for flow F1 (CWND1 912). If x does not exceed the CWND1 value, then operation 910 allows all x packets to proceed to datacenter network 908. If, on the other hand, operation 910 finds that VM 902 has sent more packets than CWND1, i.e., if x exceeds CWND1, then operation 910 allows only the CWND1 number of packets to proceed to datacenter network 908. Operation 910 drops packets (CWND1 value+1) through x, i.e., the number of excess packets that VM 902 sent in F1. Assuming that CWND1 is set to n, operation 910 allows packets 1 through n to go to datacenter network 908 and drops packets n+1 through x.

Figure 10:
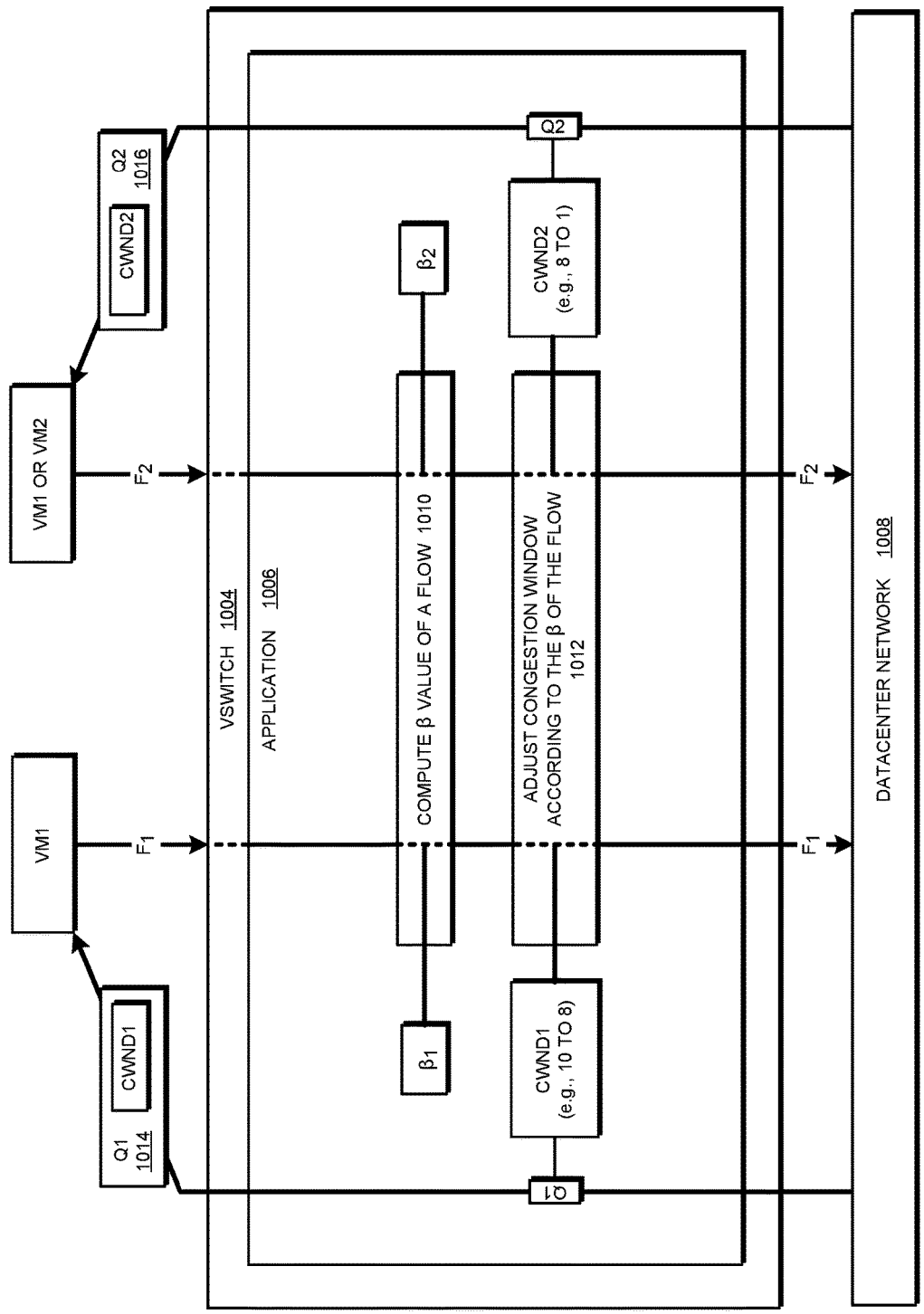
FIG. 10 depicts a block diagram of an example configuration for normalized flow value-based congestion window reduction in accordance with an illustrative embodiment.

With reference to FIG. 10, this figure depicts a block diagram of an example configuration for normalized flow value-based congestion window reduction in accordance with an illustrative embodiment. VSwitch 1004 can be an example of vSwitch 103 in FIG. 1, vSwitch 404 in FIG. 4, vSwitch 504 in FIG. 5, vSwitch 604 in FIG. 6, vSwitch 704 in FIG. 7, vSwitch 804 in FIG. 8, or vSwitch 904 in FIG. 9, depending on how and which features are implemented in a given implementation. Similarly, application 1006 can be an example of application 105 in FIG. 1, application 406 in FIG. 4, application 506 in FIG. 5, application 606 in FIG. 6, application 706 in FIG. 7, application 806 in FIG. 8, or application 906 in FIG. 9, depending on how and which features are implemented in a given implementation. VSwitch 1004 enabled by application 1006 forms another improved vSwitch as described and used herein.

Multiple outbound flows, e.g., flows F1 and F2 reach vSwitch 1004. The different flows can be from the same or different VMs. For example, flow F1 can be from VM1, which is an example of VM 902 in FIG. 9. Flow F2 can be from VM1 or from a different VM—VM2—as shown. Datacenter network 1008 is an example of datacenter network 908 in FIG. 8. CWND1 912 can be an example of CWND1 816 in FIG. 8.

Application 1006 implements operation 1010. Operation 1010 computes a normalized value for flows F1 and F2. For example, using a set or a subset of flow parameters of flow F1, operation 1010 computes normalized value $\beta 1$ for F1. Similarly, using a set or a subset of flow parameters of flow F2, operation 1010 computes normalized value $\beta 2$ for F2. Flows F1 and F2 are sent to datacenter network 1008 in any manner described herein.

Application 1006 also computes vSwitch 1004's CWND values for flows F1 and F2. For example, using any operation(s) described herein, application 1006 has previously computed CWND1 value for F1, e.g., a value of 10. Similarly, using any operation(s) described herein, application 1006 has previously computed CWND2 value for F2, e.g., a value of 8.

Application 1006 also implements operation 1012. Operation 1012 adjusts a congestion window of a flow (the vSwitch's CWND value for a flow) by applying a rule, logic, or computation to the flow's normalized value. For example, assume that β1 for F1 is 0.8 (a high value) on a normalized scale of 0 to 1, and β2 for F2 is 0.4 (a low value) on the same normalized scale. Using β1 of F1, operation 1012 reduces CWND1 value of 10 to a value of 8 (a small reduction in the window). Using β2 of F2, operation 1012 reduces CWND2 value of 8 to a value of 1 (a large reduction in the window).

When an inbound packet corresponding to a flow is received, application 1006 sets the upper bound on the number of future packets for the flow in a manner described herein. For example, when, corresponding to a packet in flow F1, inbound packet Q1 is received at vSwitch 1004, application 1006 overwrites an RWND field in packet Q1 with the reduced CWND1 value of 8. Modified packet 1014 is packet Q1 with the reduced CWND1 value in the RWND field. Similarly, when, corresponding to a packet in flow F2, inbound packet Q2 is received at vSwitch 1004, application 1006 overwrites an RWND field in packet Q2 with the reduced CWND2 value of 1. Modified packet 1016 is packet Q2 with the reduced CWND2 value in the RWND field.

Figure 11:
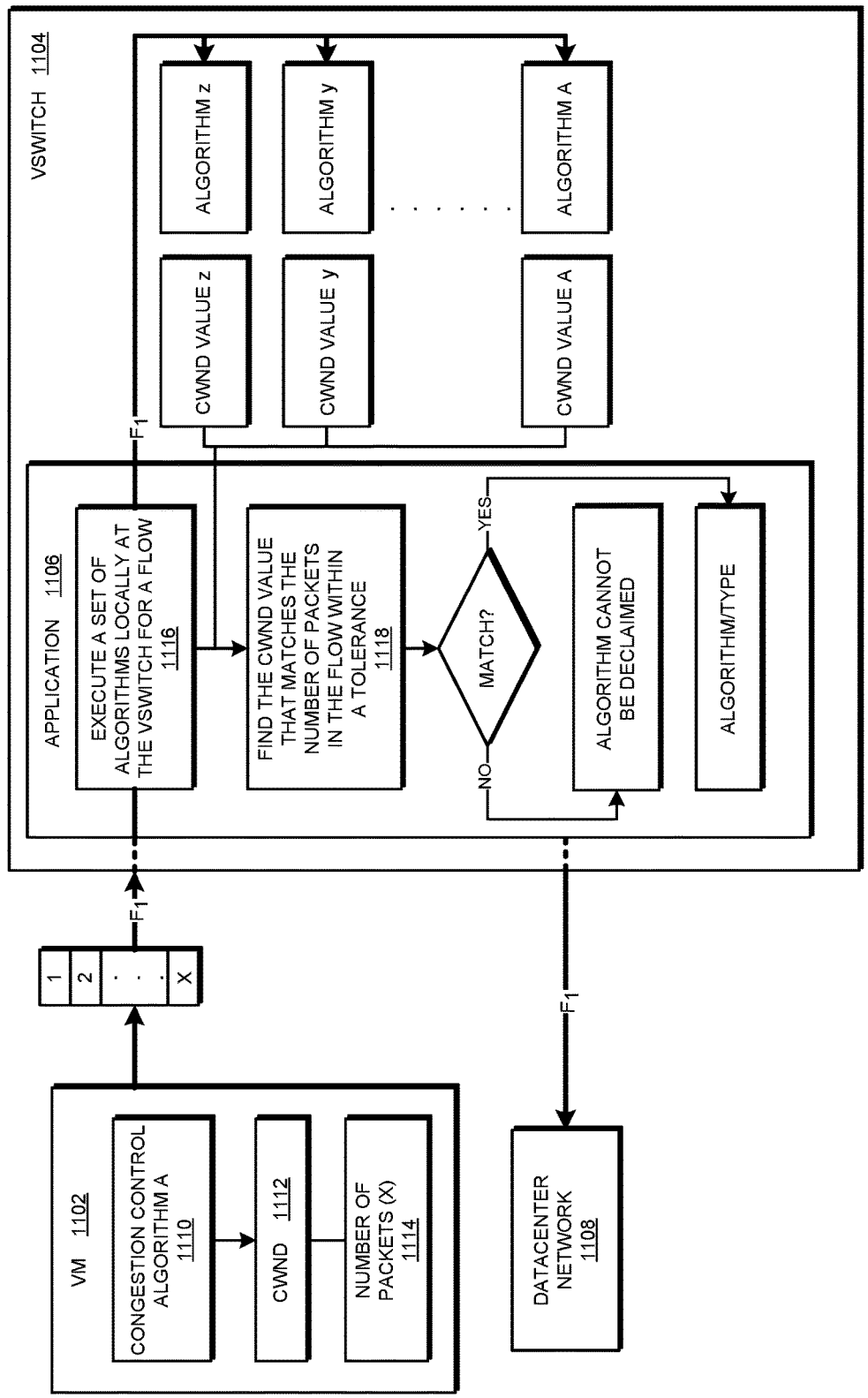
FIG. 11 depicts a block diagram of an example configuration for datacenter-level identification of a type of congestion control algorithm implemented locally in a VM in accordance with an illustrative embodiment.

With reference to FIG. 11, this figure depicts a block diagram of an example configuration for datacenter-level identification of a type of congestion control algorithm implemented locally in a VM in accordance with an illustrative embodiment. VSwitch 1104 can be an example of vSwitch 103 in FIG. 1, vSwitch 404 in FIG. 4, vSwitch 504 in FIG. 5, vSwitch 604 in FIG. 6, vSwitch 704 in FIG. 7, vSwitch 804 in FIG. 8, vSwitch 904 in FIG. 9, or vSwitch 1004 in FIG. 10, depending on how and which features are implemented in a given implementation. Similarly, application 1106 can be an example of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10, depending on how and which features are implemented in a given implementation. VSwitch 1104 enabled by application 1106 forms another improved vSwitch as described and used herein. Datacenter network 1108 is an example of datacenter network 1008 in FIG. 10.

Suppose that an operating system of VM 1102 implements congestion control algorithm A (1110) locally at VM 1102. Algorithm 1110 computes a value for CWND 1112, which is local to VM 1102. A local TCP/IP stack of VM 1102 uses CWND 1112 to determine number 1114 of packets that should be transmitted in a flow, e.g., in flow F1 from VM 1102. Suppose that number 1114 of packets is x. Accordingly, VM 1102 transmits packets 1, 2, . . . x, to wit, x packets, in flow F1 to vSwitch 1104.

Because vSwitch 1104 is implemented at the datacenter-level, and because VM 1102 is under the control of a tenant, vSwitch 1104 does not have the information to identify algorithm 1110 or its type. As described herein, it is useful for the datacenter to learn an identifier of algorithm 1110 or its type that VM 1102 has employed for congestion control.

Application 1106 implements operation 1116. Operation 1116 executes locally at vSwitch 1104, or invokes from vSwitch 1104, a set of congestion control algorithms. Suppose that the set of congestion control algorithms executable at vSwitch 1104 or invocable from vSwitch 1104 includes congestion control algorithms A, B, . . . Y, and Z. Each congestion control algorithm produces a corresponding CWND value at the vSwitch-level for a given flow. Operation 1116 causes the set or a subset of the congestion control algorithms to compute vSwitch-level CWND values for flow F1. Suppose that congestion control algorithm A produces CWND value A for F1 for vSwitch 1104, and so on, with CWND value B, . . . CWND value Y, and CWND value Z produced for F1 at vSwitch 1104 in a similar manner by their corresponding congestion control algorithms.

Application 1106 implements operation 1118. Operation 1118 determines whether any of the vSwitch-level CWND values match within a tolerance with the number of packets in flow F1 (x). If no CWND value from any congestion control algorithm in the selected set/subset matches the number of packets in flow F1 within the specified tolerance, operation 1118 concludes that the congestion control algorithm employed by VM 1102 cannot be identified. If a CWND value from a congestion control algorithm in the selected set/subset matches the number of packets in flow F1 within the specified tolerance, operation 1118 concludes that the congestion control algorithm that produced the matching CWND value is the congestion control algorithm or the type of congestion control algorithm that its employed by VM 1102. As described herein, all or some congestion control algorithms could output their respective similarity index or indices.

Figure 12:
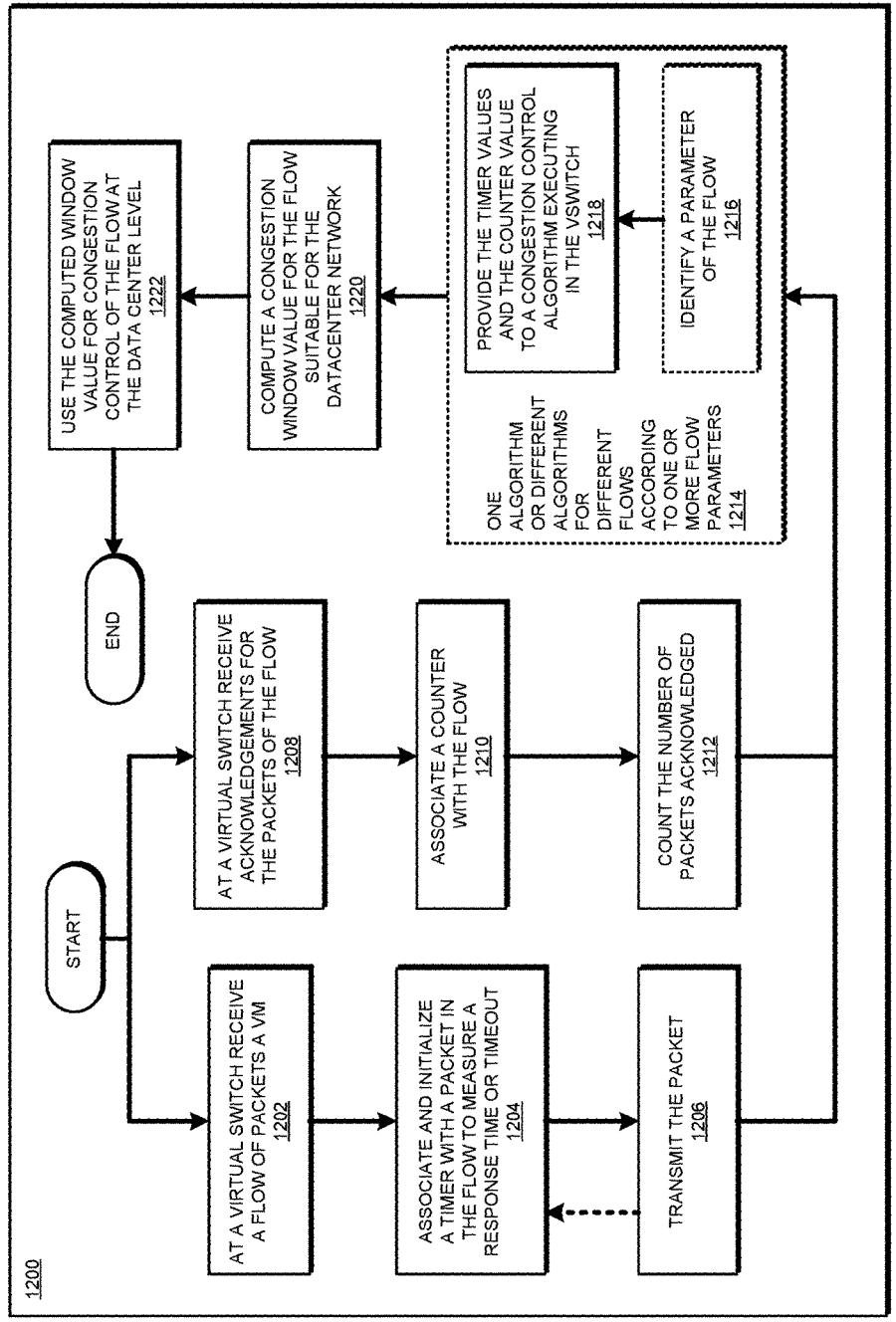
FIG. 12 depicts a flowchart of an example process for virtual switch-based congestion control for datacenter networks in accordance with an illustrative embodiment.

With reference to FIG. 12, this figure depicts a flowchart of an example process for virtual switch-based congestion control for datacenter networks in accordance with an illustrative embodiment. Process 1200 can be implemented in any of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10.

The application executes at a vSwitch in a datacenter host and receives a flow of packets from a VM executing on the host (block 1202). The application associates and initializes a timer with a packet in the flow to measure a time to response or timeout of the packet (block 1204). The application transmits the packet on the datacenter network (block 1206). The application repeats block 1204 for as many packets from the flow as may be suitable in a given implementation.

The application begins receiving responses, such as ACKs, to the transmitted packets (block 1208). The application associates a counter with the flow (block 1210). The application counts the number of packets ACKed for the flow (block 1212).

In one embodiment, when a common congestion control algorithm is used at the vSwitch for all flows flowing through the vSwitch (one case of block 1214), the application provides the timer values and the counter value to the congestion control algorithm executing in the vSwitch or invoked from the vSwitch (block 1218). In another embodiment, when different congestion control algorithms are used at the vSwitch for different flows flowing through the vSwitch (another case of block 1214), the application identifies a set of flow parameters (block 1216). The application selects a congestion control algorithm to use with the flow according to the set or a subset of the flow parameters of the flow. The application provides the timer values and the counter value to the selected congestion control algorithm, which is executing in the vSwitch or invoked from the vSwitch (block 1218).

Using the timer values, the counter, and the selected or common congestion control algorithm, the application computes a congestion window value (block 1220). The application uses the computed congestion window value for congestion control of the flow at the datacenter level (block 1222). The application ends process 1200 thereafter.

Figure 13:
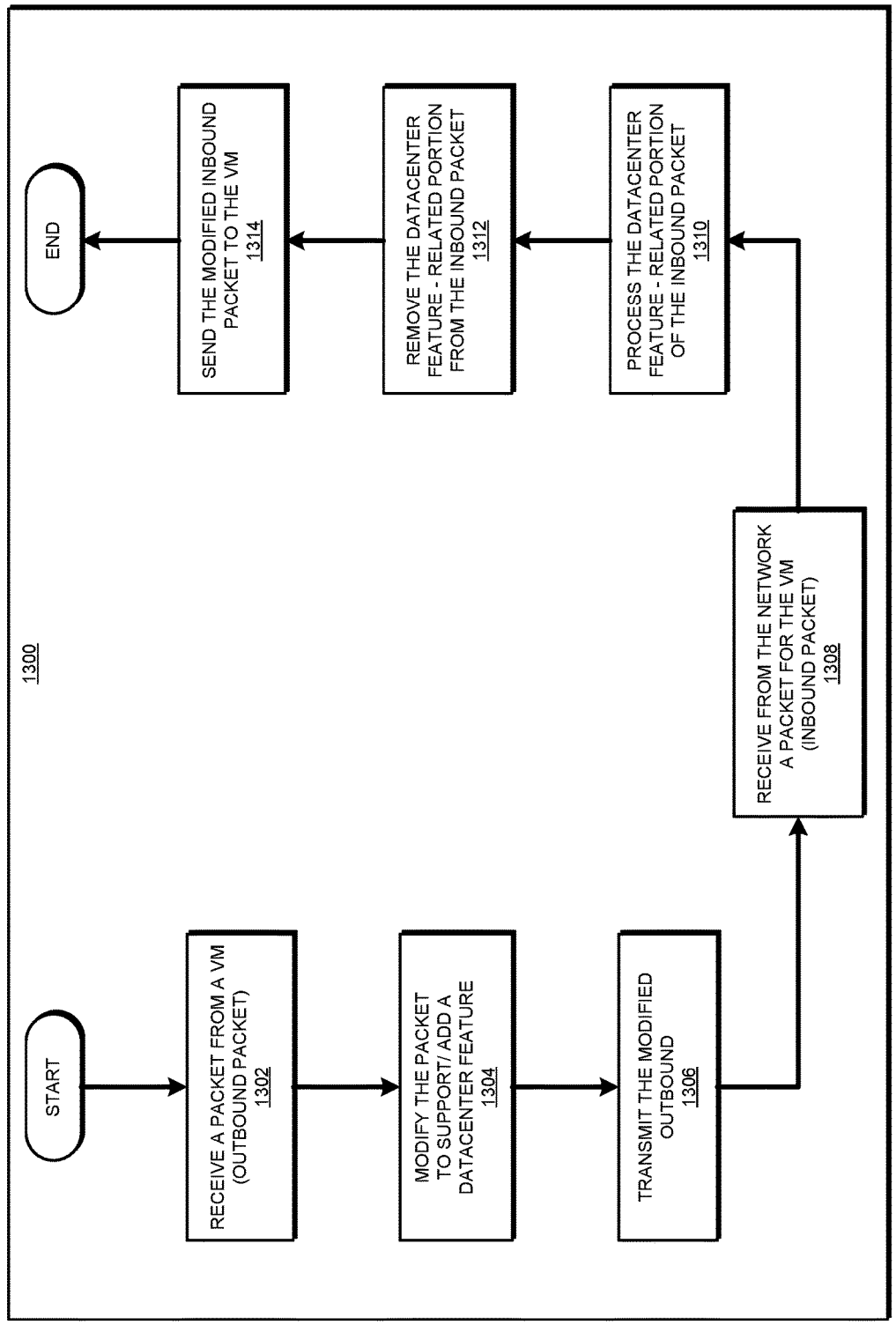
FIG. 13 depicts a flowchart of an example process for enabling a feature for datacenter-level congestion control in accordance with an illustrative embodiment.

With reference to FIG. 13, this figure depicts a flowchart of an example process for enabling a feature for datacenter-level congestion control in accordance with an illustrative embodiment. Process 1300 can be implemented in any of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10.

The application receives an outbound packet from a VM in an outbound flow (block 1302). The application modifies the packet to support or add a datacenter feature, such as by adding or setting an ECN-capable flag in the packet (block 1304). The application transmits the modified packet over the datacenter network (block 1306).

For example, according to one embodiment, the application operates in a vSwitch that supports network virtualization, which modify packets by adding a virtualization header (VxLAN) to the outbound packet, and sends the modified packet over the datacenter network to a receiver. A similarly enabled vSwitch operating at the receiver removes the VxLAN header to recover the original outbound packet, and sends the original to its destination. Generally, an embodiment can be adapted to modify an outbound packet using these and other congestion-control related modifications, which will be apparent from this disclosure to those of ordinary skill in the art. such adaptations and other congestion-control related modifications are contemplated within the scope of the illustrative embodiments.

The application receives from the datacenter network an inbound packet for the VM (block 1308). The application processes the datacenter feature-related portion of the inbound packet, e.g., the congestion encountered data bits in the inbound packet (block 1310).

The application removes, deletes, or otherwise renders the processed portion of the inbound packet useless or meaningless for the VM (block 1312). The removal causes a modified inbound packet to be created. The application sends the modified inbound packet to the VM (block 1314). The application ends process 1300 thereafter.

Figure 14:
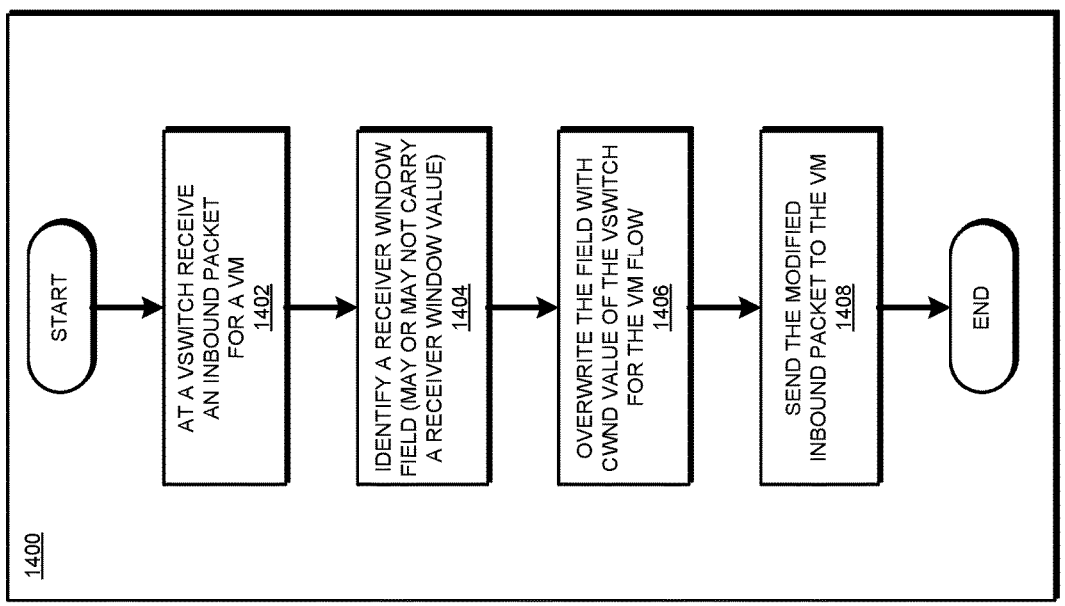
FIG. 14 depicts a flowchart of an example process for enforcing datacenter-level congestion control in accordance with an illustrative embodiment.

With reference to FIG. 14, this figure depicts a flowchart of an example process for enforcing datacenter-level congestion control in accordance with an illustrative embodiment. Process 1400 can be implemented in any of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10.

The application executes at a vSwitch in a host in a datacenter and receives an inbound packet for a VM operating in the host (block 1402). The application identifies a field in the packet where the sender of the packet (a receiver from the VM's perspective) can provide an RWND value (block 1404). Note that the receiver may provide, but it is not necessary that the receiver provide, the RWND value in that field, just that the field is identified. In practice a receiver always fills this value as this value is located in the TCP header. According to one embodiment, the application overwrites the RWND value only if the vSwitch's CWND value is less than the receiver's RWND value. The application overwrites the RWND field with a vSwitch-computed CWND value for a flow from the VM (block 1406). The overwriting produces a modified inbound packet. The application sends the modified inbound packet to the VM (block 1408). The application ends process 1400 thereafter.

Figure 15:
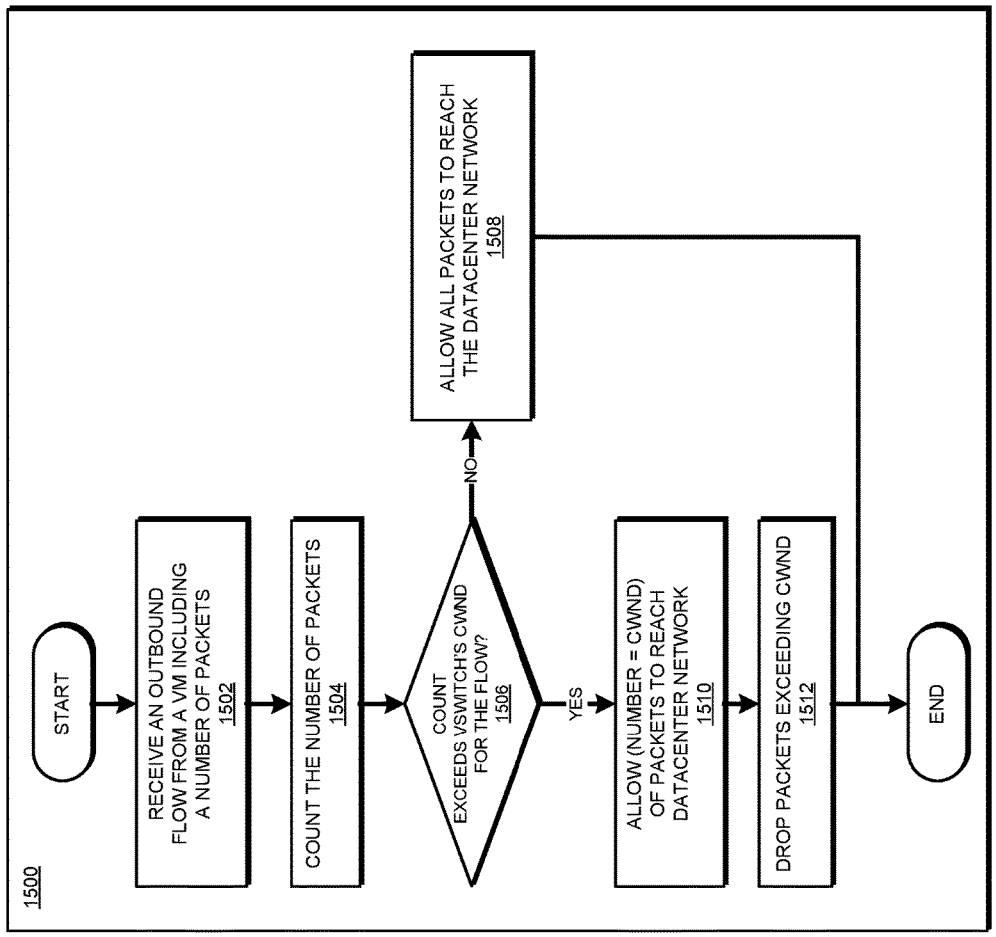
FIG. 15 depicts a flowchart of an example process for datacenter-level policing of a VM's congestion control behavior in accordance with an illustrative embodiment.

With reference to FIG. 15, this figure depicts a flowchart of an example process for datacenter-level policing of a VM's congestion control behavior in accordance with an illustrative embodiment. Process 1500 can be implemented in any of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10.

The application executes at a vSwitch in a host in a datacenter and receives an outbound flow from a VM operating in the host, the flow includes a number of packets (block 1502). The application counts the number of packets in the flow (block 1504).

The application determines whether the number exceeds a CWND value set at the vSwitch for the flow from the VM (block 1506). If the number does not exceed the CWND value set at the vSwitch for the flow from the VM ("No" path of block 1506), the application allows all the packets that were received in the flow to proceed to the datacenter network (block 1508). The application ends process 1500 thereafter.

If the number exceeds the CWND value set at the vSwitch for the flow from the VM ("Yes" path of block 1506), the application allows only that number of packets which equals the CWND value to proceed to the datacenter network (block 1510). The application drops the excess packets (block 1512). The application ends process 1500 thereafter.

While certain embodiments and operations are described with a feature to drop the excess packets, other treatments of these excess packets is also possible within the scope of the illustrative embodiments. For example, an embodiment can be modified within the scope of the illustrative embodiments to buffer the excess packets such that the excess packets can be transmitted from the vSwitch in a manner that does not require the VM to retransmit the packets.

Figure 16:
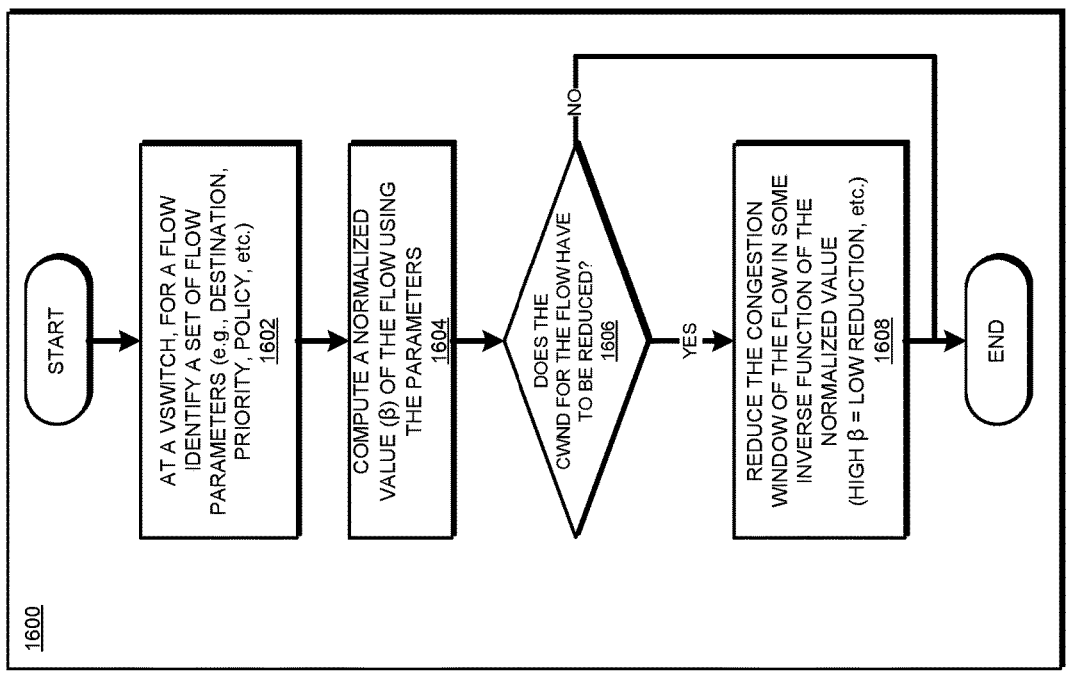
FIG. 16 depicts a flowchart of an example process for normalized flow value-based congestion window reduction in accordance with an illustrative embodiment.

With reference to FIG. 16, this figure depicts a flowchart of an example process for normalized flow value-based congestion window reduction in accordance with an illustrative embodiment. Process 1600 can be implemented in any of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10.

The application executes at a vSwitch in a host in a datacenter and identifies a set of flow parameters for an outbound flow from a VM operating in the host (block 1602). The application computes a normalized value ((3) of the flow using the set or a subset of the flow parameters (block 1604).

The application determines whether the CWND value computed at the vSwitch for the flow from the VM has to be reduced (block 1606). If the CWND value computed at the vSwitch for the flow from the VM does not have to be reduced ("No" path of block 1606), the application ends process 1600 thereafter. If the CWND value computed at the vSwitch for the flow from the VM has to be reduced ("Yes" path of block 1606), the application reduces the CWND value in some inverse function of the normalized value of the flow (block 1608). The application ends process 1600 thereafter.

Figure 17:
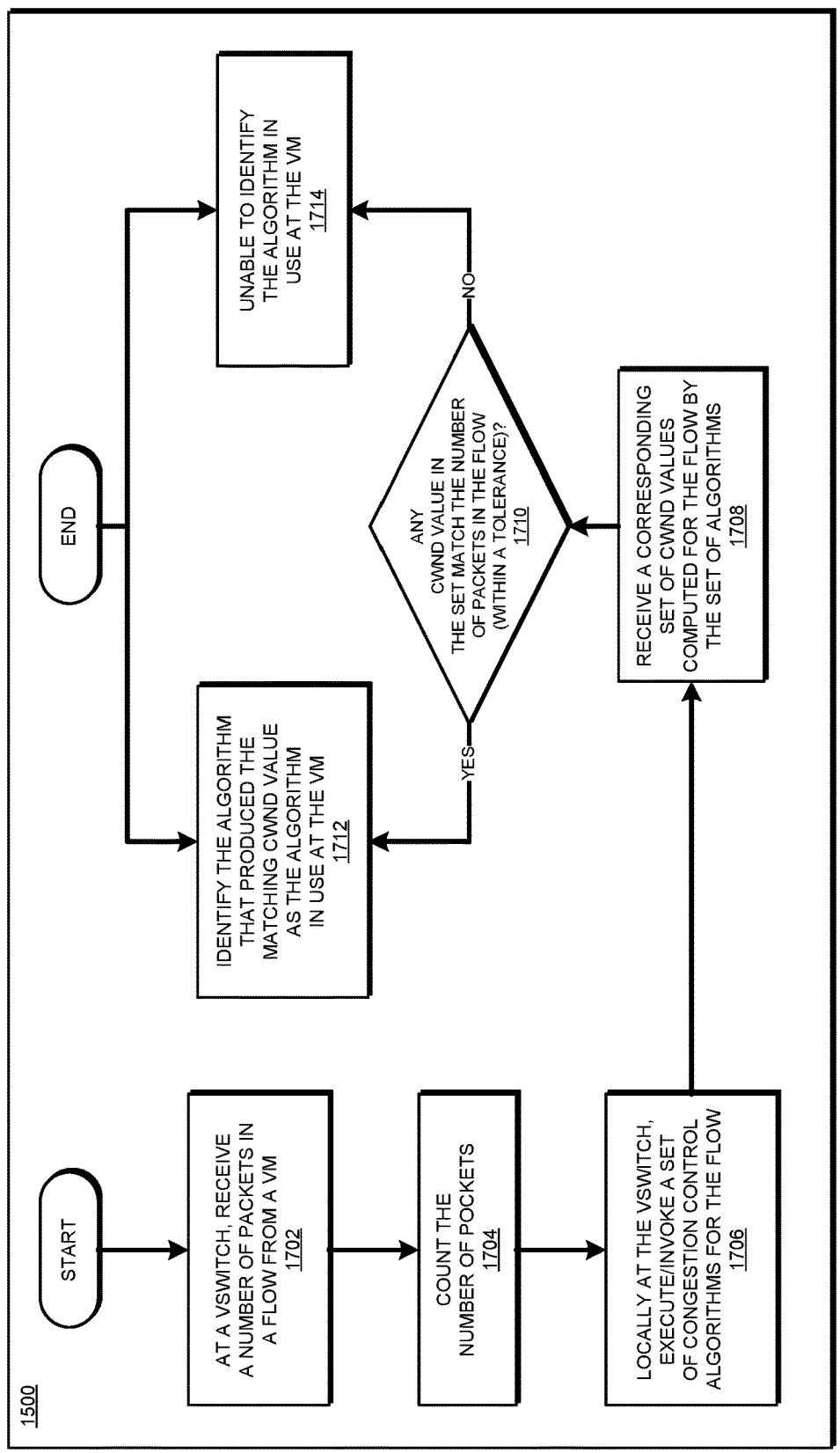
FIG. 17 depicts a flowchart of an example process for datacenter-level identification of a type of congestion control algorithm implemented locally in a VM in accordance with an illustrative embodiment.

With reference to FIG. 17, this figure depicts a flowchart of an example process for datacenter-level identification of a type of congestion control algorithm implemented locally in a VM in accordance with an illustrative embodiment. Process 1700 can be implemented in any of application 105 in FIG. 1, application 406 in FIG. 4, application 506 in FIG. 5, application 606 in FIG. 6, application 706 in FIG. 7, application 806 in FIG. 8, application 906 in FIG. 9, or application 1006 in FIG. 10.

The application executes at a vSwitch in a host in a datacenter and receives a number of packets in an outbound flow from a VM operating in the host (block 1702). The application counts the number of packets (block 1704).

The application executes locally at the vSwitch, or invokes from the vSwitch, a set of congestion control algorithms for the flow (block 1706). From each congestion control algorithm executed or invoked for the flow, the application receives a corresponding CWND value for the flow that should be applied to the flow at the vSwitch (block 1708).

The application determines whether the number of packets in the flow matches any of the CWND values received in block 1708 (block 1710). The match in block 1710 may be exact or within a specified tolerance value, as needed in a particular implementation. If the number of packets in the flow matches any of the CWND values within the specified tolerance ("Yes" path of block 1710), the application determines that the congestion control algorithm executing at or invoked from the vSwitch that produced the matching CWND value is the congestion control algorithm or the type of congestion control algorithm that is being executed locally within the VM as well (block 1712). The application ends process 1700 thereafter.

If the number of packets in the flow fails to match any of the CWND values within the tolerance ("No" path of block 1710), the application concludes that the congestion control algorithm being used locally within the VM cannot be determined (block 1714). The application ends process 1700 thereafter.

Thus, a computer implemented method, system or apparatus, and computer program product are provided in the illustrative embodiments for virtual switch-based congestion control for datacenter networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
configuring a timer to associate with a packet of a data flow (flow) in a Transmission Control Protocol(TCP) data communication network;
detecting a successful transmission of the packet by using the timer to measure a period from a time when the packet is received for transmission at a virtual switch (vSwitch);
computing, at an application executing in conjunction with vSwitch in a host system, using the period measured by the timer and a number of packets of the flow received and acknowledged in response packets, the number being counted by a counter, a congestion window (CWND value) corresponding to the flow from a virtual machine (VM); and
modifying, to form a modified response packet, a response packet received from a receiver of the flow, the response packet corresponding to a packet in the flow, the modifying comprising overwriting a field in the response packet with the CWND value, the field being designated for carrying a receiver advertised window (RWND value).

2. The method of claim 1, further comprising:
receiving, at the vSwitch from the VM, a second flow, the second flow, the second flow comprising a set of packets;
counting, at the application, a number of packets present in the set of packets of the second flow;
determining whether the number of packets in the set of packets of the second flow exceeds the CWND value; and
sending, responsive to the number of packets in the set of packets in the second flow exceeding the CWND value, a first subset of the packets from the second flow to a network, the first subset including a number of packets equaling the CWND value.

3. The method of claim 2, further comprising:
dropping, responsive to the number of packets in the set of packets in the second flow exceeding the CWND value, a second subset of the packets from the second flow, the second subset including a remaining number of packets in the set of packets of the second flow.

4. The method of claim 3, wherein the set of packets are arranged in an order, wherein the first subset comprises the first CWND value number of packets in the set of packets, and the second subset of packets are ordered after the first subset in the set of packets.

5. The method of claim 1, further comprising:
overwriting, as a part of the storing, a RWND value stored in the field by the receiver of the flow, the storing causing the VM to use the CWND value computed at the application as the RWND value of the receiver.

6. The method of claim 1, further comprising:
counting, at the application, using a counter, a number of outbound packets corresponding to the flow that are acknowledged in the response packet received from the receiver.

7. The method of claim 1, further comprising:
computing, at the application, a second CWND value using a second period measured by a second timer, and a second number of packets of a second flow acknowledged in response packets, the second number being counted by a second counter, the second timer and the second counter being associated with the second flow; and
applying the second CWND to the second flow at the vSwitch such that the vSwitch transmits, from the second flow to the network, only a second number of packets up to the second CWND value.

8. The method of claim 7, wherein the second flow is from the VM.

9. The method of claim 7, wherein the second flow is from a second VM, wherein the second VM also operates in the host system and uses the vSwitch for data communications over a network.

10. The method of claim 1, wherein the CWND value is specifically for the flow from the VM, and wherein the CWND is computed and used outside the VM.

11. The method of claim 1, wherein the VM also executes in the host system, wherein the vSwitch is external to the VM in the host, and wherein data communications to and from the VM occur through the vSwitch.

12. The method of claim 1, wherein the period is between sending the packet to the receiver and receiving a response packet corresponding to the packet from the receiver.

13. A computer usable program product comprising a computer readable storage device including computer usable code, the computer usable code, when executed by a processor causing operations comprising:
- configuring a timer to associate with a packet of a data flow (flow) in a Transmission Control Protocol (TCP) data communication network;
- detecting a successful transmission of the packet by using the timer to measure a period from a time when the packet is received for transmission at a virtual switch (vSwitch);
- computing, at an application executing in conjunction with vSwitch in a host system, using the period measured by the timer and a number of packets of the flow received and acknowledged in response packets, the number being counted by a counter, a congestion window (CWND value) corresponding to the flow from a virtual machine (VM); and
- modifying, to form a modified response packet, a response packet received from a receiver of the flow, the response packet corresponding to a packet in the flow, the modifying comprising overwriting a field in the response packet with the CWND value, the field being designated for carrying a receiver advertised window (RWND value).

14. The computer usable program product of claim 13, the operations further comprising:
- receiving, at the vSwitch from the VM, a second flow, the second flow, the second flow comprising a set of packets;
- counting, at the application, a number of packets present in the set of packets of the second flow;
- determining whether the number of packets in the set of packets of the second flow exceeds the CWND value; and
- sending, responsive to the number of packets in the set of packets in the second flow exceeding the CWND value, a first subset of the packets from the second flow to a network, the first subset including a number of packets equaling the CWND value.

15. The computer usable program product of claim 14, the operations further comprising:
- dropping, responsive to the number of packets in the set of packets in the second flow exceeding the CWND value, a second subset of the packets from the second flow, the second subset including a remaining number of packets in the set of packets of the second flow.

16. The computer usable program product of claim 15, wherein the set of packets are arranged in an order, wherein the first subset comprises the first CWND value number of packets in the set of packets, and the second subset of packets are ordered after the first subset in the set of packets.

17. The computer usable program product of claim 13, the operations further comprising:
- overwriting, as a part of the storing, a RWND value stored in the field by the receiver of the flow, the storing causing the VM to use the CWND value computed at the application as the RWND value of the receiver.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A data processing system comprising:
- a storage device, wherein the storage device stores computer usable program code; and
- a processor, wherein the processor executes the computer usable program code, and wherein the computer usable program code when executed by the processor causes operations comprising:
  - configuring a timer to associate with a packet of a data flow (flow) in a Transmission Control Protocol (TCP) data communication network;
  - detecting a successful transmission of the packet by using the timer to measure a period from a time when the packet is received for transmission at a virtual switch (vSwitch);
  - computing, at an application executing in conjunction with vSwitch in a host system, using the period measured by the timer and a number of packets of the flow received and acknowledged in response packets, the number being counted by a counter, a congestion window (CWND value) corresponding to the flow from a virtual machine (VM); and
  - modifying, to form a modified response packet, a response packet received from a receiver of the flow, the response packet corresponding to a packet in the flow, the modifying comprising overwriting a field in the response packet with the CWND value, the field being designated for carrying a receiver advertised window (RWND value).

* * * * *